United States Patent [19]
Ogawa et al.

[11] Patent Number: 4,620,233
[45] Date of Patent: Oct. 28, 1986

[54] FACSIMILE TRANSCEIVER UTILIZING ORTHOGONAL CONVERSION

[75] Inventors: Mutsuo Ogawa; Takemi Hashimoto; Kazuyuki Hara; Mitsuru Kondo, all of Tokyo, Japan

[73] Assignee: Ricoh Company, Ltd., Tokyo, Japan

[21] Appl. No.: 454,307

[22] Filed: Dec. 29, 1982

Related U.S. Application Data

[63] Continuation-in-part of Ser. No. 967,834, Dec. 8, 1978, abandoned.

[30] Foreign Application Priority Data

Dec. 19, 1977 [JP] Japan ................... 52-151731

[51] Int. Cl.$^4$ ............................................. H04N 7/40
[52] U.S. Cl. ....................... 358/260; 358/286; 358/293
[58] Field of Search ............... 358/260, 261, 293, 294, 358/286, 285

[56] References Cited

U.S. PATENT DOCUMENTS

| | | | |
|---|---|---|---|
| 2,953,638 | 9/1960 | Wintringham | 358/260 |
| 3,344,231 | 9/1967 | Dodd et al. | 358/260 |
| 3,622,695 | 11/1971 | Rugaber | 358/260 |
| 4,117,517 | 9/1978 | Shintani et al. | 358/260 |
| 4,134,135 | 1/1979 | Inokuchi et al. | 358/294 |
| 4,240,117 | 12/1980 | Wellendorf | 358/293 |
| 4,268,870 | 5/1981 | Kitamura | 358/285 |

OTHER PUBLICATIONS

Garwin et al., "Use of Tilted Arrays", IBM Tech. Disclosure Bulletin-vol. 20, No. 1, Jun. 1977, pp. 396-399.

Primary Examiner—Joseph A. Orsino, Jr.
Attorney, Agent, or Firm—David G. Alexander

[57] ABSTRACT

A scanning array (12) comprising a plurality of photosensor elements (12a) is reciprocated perpendicular to the axis (12b) thereof to scan a rectangular area of an original document (69). After scanning the area, the document (69) is moved parallel to the axis (12b) of the scanning array (12) and the scanning array (12) reciprocated again to scan a next rectangular area. This process is continued until the entire document (69) is scanned. The photosensor elements (12a) produce data signals corresponding to incident light from the document (69) which are fed serially into an orthogonal conversion memory (26) in the column direction. The data signals are read out of the memory (26) in the row direction and run length encoded for transmission. Received data signals are run length decoded and fed into the memory (26) in the row direction and read out of the memory (26) in the column direction. The received data signals are then applied to a printing array (24) of printing elements (24a) which is reciprocated relative to a sheet of paper (78) in the same pattern as the scanning array (12) to reproduce an image represented by the received data signals. The data signals are subjected to orthogonal conversion for transmission and to reverse orthogonal conversion for reception, thereby increasing the data compression efficiency.

16 Claims, 23 Drawing Figures

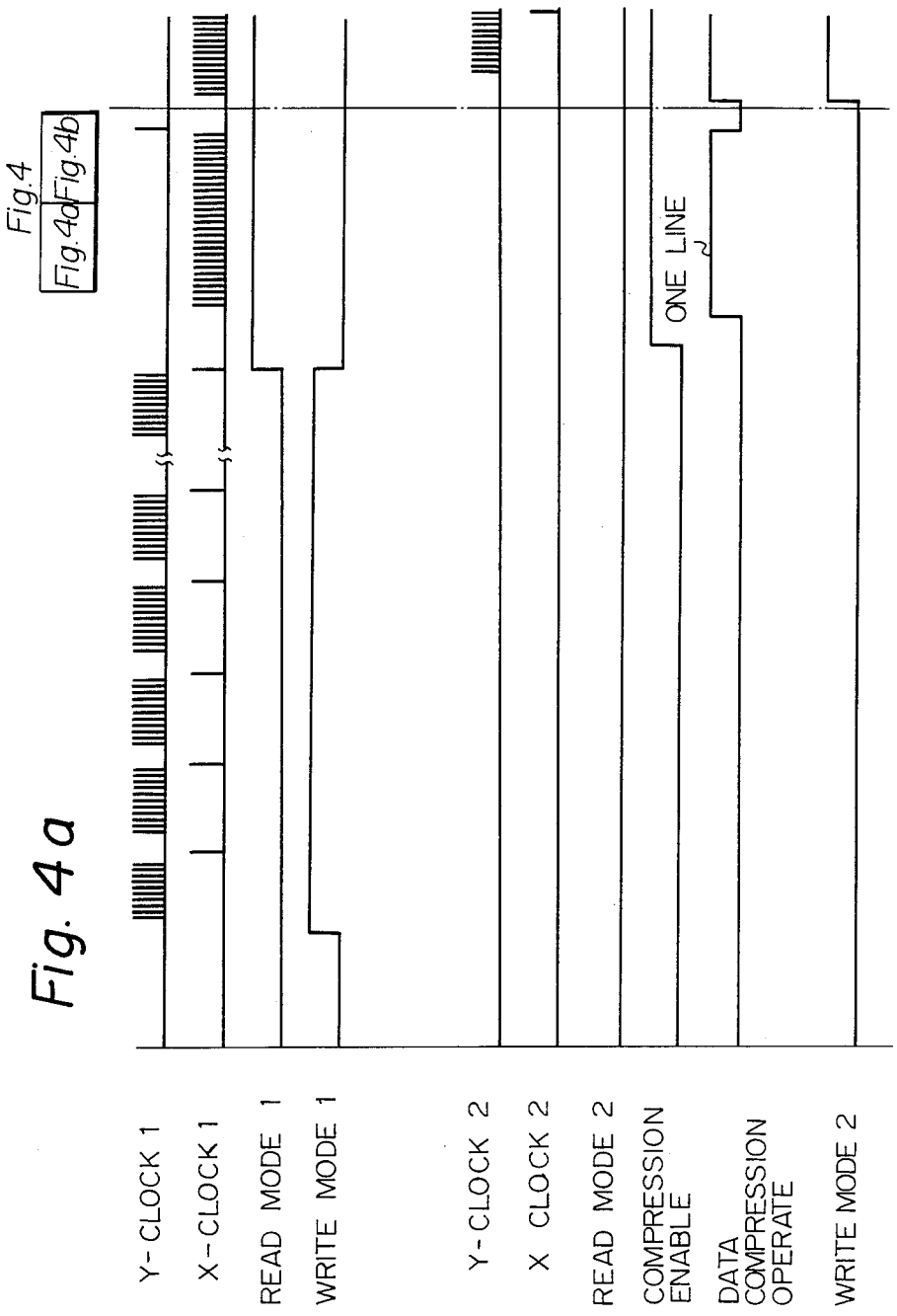

STANDARD MODE (4 $\ell$/mm)

DETAIL MODE (8 $\ell$/mm)

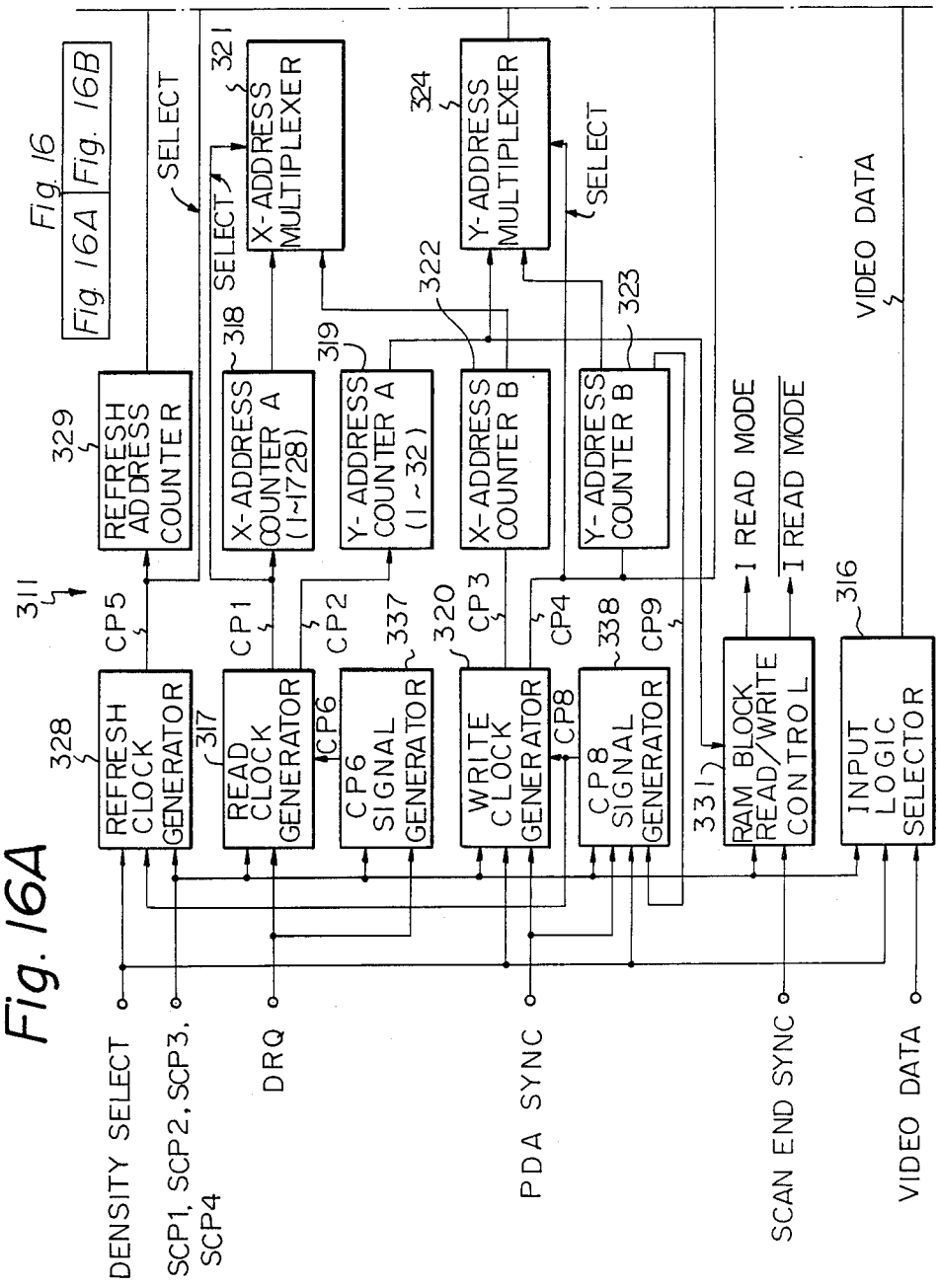

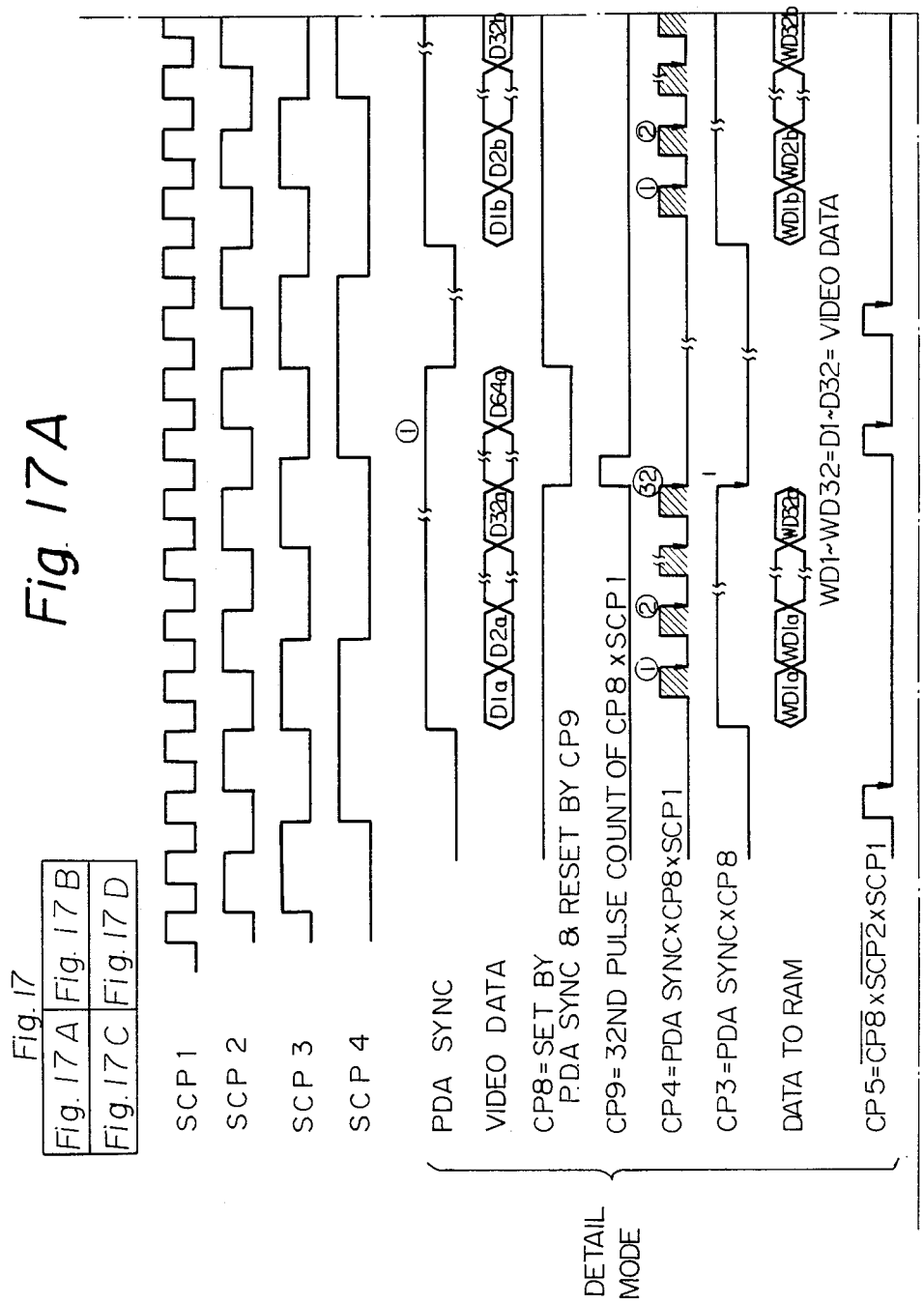

FACSIMILE TRANSCEIVER UTILIZING ORTHOGONAL CONVERSION

CROSS REFERENCE TO RELATED APPLICATION

This application is a continuation-in-part of copending U.S. patent application Ser. No. 967,834, filed Dec. 8, 1978 now abandoned.

BACKGROUND OF THE INVENTION

The present invention relates to a facsimile transceiver utilizing an orthogonal data conversion process to increase the run length data compression efficiency.

In the present type of facsimile transceiver a scanning array which is typically of the charge-coupled-device (CCD) type comprises 32 photosensor elements arranged along a linear axis. The array is reciprocated perpendicular to the axis thereof to scan a rectangular portion of an original document. The photosensor elements produce sequential output data signals corresponding to incident light. After each photosensor element produces a data signal, the array is moved by an incremental distance perpendicular to the axis of the array and the photosensor elements controlled to each produce another data signal output. After each reciprocation of the array, the document is moved parallel to the axis of the array and the arry reciprocated again to scan another rectangular area of the document. This process is repeated until the entire document is scanned.

The data signals are subjected to run length compression and transmitted to a remote transceiver which reproduces the original document in response to the signals. The compressed data signals are expanded at the receiving transceiver and applied to a printing array comprising 32 printing elements such as electrodes which is moved in the same pattern as the scanning array to print the image pattern on a sheet of paper. Typically, the printing elements will induce an electrostatic charge pattern on the paper which represents the document. A toner substance is applied to the paper to develop the electrostatic image into a toner image which is fixed to the paper to provide a permanent reproduction of the original document.

Where the line density of the transceiver is 8 lines per millimeter, the width of the scanning array is only 4 mm. This is very small compared to the length of a typical original document such as a printed page of letter size, and the array must be reciprocated a number of times to scan the document. Such an arrangement enables the facsimile transceiver to be manufactured using a small number of components at low cost since only 32 photosensor elements are required. However, there is a disadvantage in that the run length compression efficiency is low. It has been determined experimentally that many short run lengths and therefore low run lengths compression efficiency results from such a scanning arrangement in which the photosensor elements are sequentially enabled to scan the document in the length direction rather than the width direction. Whereas the compression efficiency may be improved by providing a linear photosensor array of approximately 1728 elements (for A4 size original documents) having an axis parallel to the width direction of the original document and moving the document parallel to the array while sequentially enabling or strobing the array elements to produce data signals, such an arrangement is very expensive to manufacture due to the large number of photosensor elements and connecting circuitry.

SUMMARY OF THE INVENTION

A facsimile transceiver embodying the present invention includes a scanning array of photosensor elements extending in a first direction, scan drive means for moving the scanning array in a second direction which is different from the first direction for scanning an original document, the photosensor elements sequentially producing data signals corresponding to incident light from the document, transmission means for transmitting the data signals; receiving means for receiving data signals; a printing array of printing elements extending in a third direction and print drive means for moving the printing array in a fourth direction which has a same relationship to the third direction as the second direction has to the first direction for printing a pattern on a printing surface corresponding to the received data signals. Orthogonal conversion memory means perform orthogonal conversion on data signals fed from the scanning array to the transmission means and perform reverse orthogonal conversion on data signals fed from the receiving means to the printing array.

It is an object of the present invention to provide a facsimile transceiver which is capable of substantially improved data compression efficiency compared to the prior art.

It is another object of the present invention to provide a facsimile transceiver which is inexpensive to produce on a commercial production basis yet has high resolution and high operating speed.

It is another object of the present invention to provide a facsimile transceiver which utilizes orthogonal data conversion to increase run lengths and thereby improve run length compression efficiency.

It is another object of the present invention to provide a generally improved facsimile transceiver.

Other objects, together with the foregoing, are attained in the embodiments described in the following description and illustrated in the accompanying drawings.

BRIEF DESCRIPTION OF THE DRAWING

FIGS. 4a and 4b are timing diagrams illustrating the operation of the present invention;

FIGS. 16a and 16b are schematic diagram of another embodiment of a facsimile apparatus of the present invention;

FIGS. 17a–17d are timing diagrams corresponding to the apparatus of FIG. 16.

DESCRIPTION OF THE PREFERRED EMBODIMENTS

While the facsimile transceiver of the present invention is susceptible of numerous physical embodiments, depending upon the environment and requirements of use, substantial numbers of the herein shown and described embodiments have been made, tested and used, and all have performed in an eminently satisfactory manner.

Figure 1:
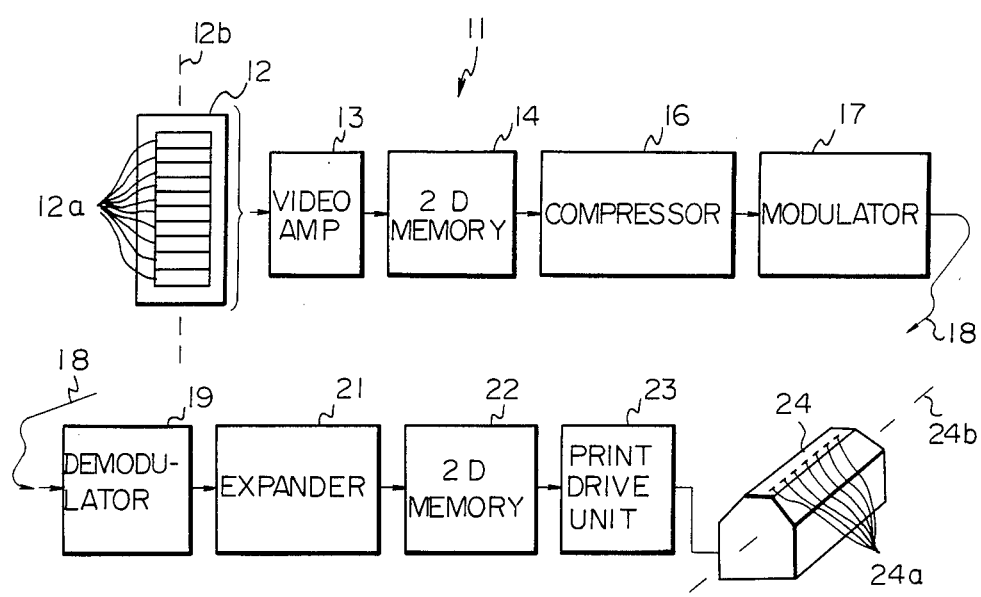
FIG. 1 is a block diagram of a facsimile transceiver embodying the present invention.

Referring now to FIG. 1 of the drawing, a facsimile transceiver embodying the present invention is generally designated by the reference numeral 11 and comprises a charge-coupled-device (CCD) linear scanning array 12. The array 12 comprises typically 32 photosensor elements, designated as 12a, although only a few elements 12a are illustrated to avoid cluttering of the drawing. The elements 12 are arranged along an axis 12b.

For scanning an original document, the array 12 is moved perpendicular to the axis 12b in a reciprocating manner. Where the line scanning density is eight lines per millimeter, the length of the array 12 is 4 mm. Taking for example an original document of A4 size, the axis 12b of the array 12 is aligned in the length direction of the document. The array 12 is moved from the left edge of the document by a distance of 216 mm to the right edge thereof and then returned to the left edge of the document. In other words, the array 12 is moved in the width direction of the document. During the rightward or scanning movement of the array 12 the elements 12a are enabled to produce data signals corresponding to incident light thereon from the document corresponding to light and dark areas thereof. During the return of leftward movement of the array 12 the data signals are processed and transmitted in a manner which will be described in detail hereinbelow.

Although the array 12 may be embodied by discrete phototransistors, photodiodes or the like or a multiplexed array of such elements, in the present example the array 12 is a CCD device and the elements 12a are sequentially enabled or strobed to produce outputs. During rightward or scanning movement of the array 12 the elements 12a are sequentially enabled or self-scanned to produce data signals corresponding to a vertical line 4 mm long on the document. Then, the array 12 is moved rightwardly by $\frac{1}{8}$ mm and the elements 12a sequentially enabled again to produce data signals corresponding to a vertical line 4 mm long spaced rightwardly of the previous vertical line by $\frac{1}{8}$ mm. This process is repeated 1728 times during each rightward movement of the array 12 to produce 55,296 data signals representing an area 4 mm long and 216 mm wide on the document. After the array 12 has been returned to its leftmost position or during leftward movement thereof, the document is moved vertically (parallel to the length direction of the document and the axis 12b of the array 12) by a distance of 4 mm, which is equal to the length of the array 12. Then, the array 12 is moved rightwardly to scan another 4 mm×216 mm area of the document which is vertically adjacent to the previous area. This process is repeated until the entire document has been scanned. Taking another exemplary case in which the original document is B4 size, each scanning area will be 4 mm×256 mm. In other words, the array 12 will be enabled to produce data signals and moved incrementally rightwardly 2048 times during each rightward movement of the array 12 to produce a total of 65,536 data signals.

The data signals are produced serially and fed through a video amplifier 13 which quantizes the data signals from analog to digital form into an orthogonal conversion memory 14. In accordance with an important feature of the present invention, which will be described in detail hereinbelow, the data signals are stored or written into the memory 14 by columns and read thereoutof by rows, thereby performing orthogonal conversion on the data signals.

The data signals are read out of the memory 14 after orthogonal conversion and run length encoded by a compressor 16. The run length encoding process is well known in the art and is not the subject matter of the present invention. It is sufficient for an understanding of this invention to know that run length encoding is performed to compress the data and thereby decrease the transmission time. The compressed data signals are fed from the compressor 16 to a modulator 17 which mixes the data signals with a carrier wave and transmits the modulated carrier wave to a remote transceiver via a communication link 18 such as a public telephone line.

The transceiver 11 further comprises a demodulator 19 for demodulating data signals transmitted to the transceiver 11 from a remote transceiver via the link 18. The demodulated data signals are fed to an expander 21 which performs run length decoding on the data signals. The run length decoding process is the reverse of the run length encoding process. The expanded data signals are fed into another orthogonal conversion memory 22 which is generally identical to the memory 14. In accordance with the principle of the present invention, the data signals are stored in the memory 22 in rows and read thereoutof in columns. This constitutes a reverse orthogonal conversion process. The data signals read out of the memory 22 and applied to a print drive unit 23 are identical to the data signals written into the memory 14 from the video amplifier 13 due to the double orthogonal conversion process.

The data signals are applied from the print drive unit 23 to a printing array 24 which comprises 32 printing elements 24a arranged along an axis 24b. The array 24 is moved relative to a sheet of printing paper in a manner identical to the array 12 to print a pattern on the paper corresponding to the received data signals and thereby produce a hard copy of an original document scanned by the remote transceiver. The printing elements are typically electrodes which apply electrostatic charges to the paper. A toner substance is applied to the paper to develop the electrostatic pattern or image into a toner image. The toner image is fixed to the paper to provide a permanent facsimile reproduction.

Since the data signals are produced serially in the length direction of the original document by the 32 elements of the array 12, the run lengths are generally short resulting in low compression efficiency by the compressor 16. This in turn results in excessive transmission time. However, the orthogonal conversion process results in the data signals being run length encoded in the width direction of the document, rather than the length direction, and substantially increases the compression efficiency since the run lengths are longer in the width direction of the document.

Figure 2:
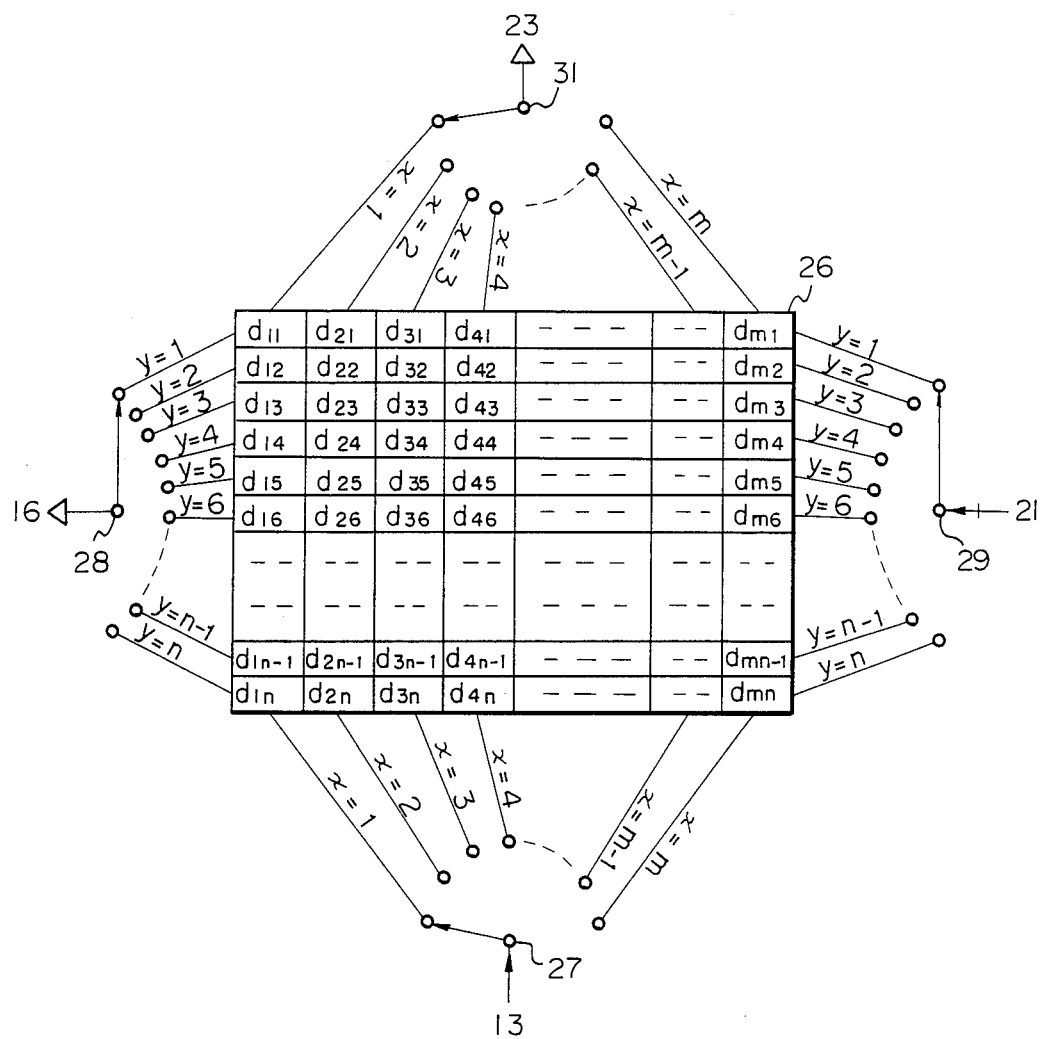
FIG. 2 is a diagram symbolically illustrating the principle of the present invention.

The orthogonal conversion process will now be described in a symbolic manner with reference being made to FIG. 2. It will be understood that the number and complexity of component parts of the apparatus 11 may be substantially reduced by embodying the memories 14 and 22 by a single memory 26 which may be selectively connected between the video amplifier 13 and the compressor 16 for transmission or between the expander 21 and the print drive unit 23 for reception. This is accomplished by means of n-position selector switches 28 and 29 and m-position selector switches 27 and 31. The movable contact of the switch 27 is connected to the output of the video amplifier 13. The movable contact of the switch 28 is connected to the input of the compressor 16. The movable contact of the switch 29 is connected to the output of the expander 21. The movable contact of the switch 31 is connected to the input of the print drive unit 23.

The following direction conventions will be used in the following description.

The horizontal direction is the width direction of an original document or sheet of printing paper, is perpendicular to the axes 12b and 24b of the arrays 12 and 24 respectively, is designated as an X-direction and row direction in the memory 26 and is further designated as a main scan direction.

The vertical direction is the length direction of an original document or sheet of printing paper, is parallel to the axes 12b and 24b of the arrays 12 and 24 respectively and is designated as a Y-direction and column direction in the memory 26 and is further designated as a subscan direction.

The memory 26 is a rectangular memory having m locations in the X-direction (m columns) and n locations in the Y-direction (n rows). In the present example for A4 size paper, n=32 and m=1728. Thus, the capacity of the memory 26 is 55,296 locations. It will be further assumed that the memory 26 is serial-in, serial-out and has first-in-first-out (FIFO) logic. The data locations are designated as dxy, where x is the column number and y is the row number.

For transmission, the switches 27 and 28 are connected to the video amplifier 13 and compressor 16 respectively and the switches 29 and 31 are disconnected from the expander 21 and drive unit 23 respectively. Assuming that the array 12 is at its leftmost position, the elements 12a are sequentially enabled and the data signals produced thereby stored in the memory locations d11 to d1n respectively. To accomplish this, the switch 27 connects the video amplifier 13 to an input terminal for the first column x=1 in the memory 26. n=32 clock or strobe pulses are applied simultaneously to the array 12 and memory 26 to sequentially store the data signals from the array 12 in the data locations d11 to d1n respectively. Then, the switch 27 connects the video amplifier 13 to an input terminal for the second column x=2 in the memory 26 and the array 12 is moved rightwardly by $\frac{1}{8}$ mm. Then, 32 clock pulses are applied to the array 12 and memory 26 causing the next data signals to be stored in the locations d21 to d2n respectively. This process is repeated 1728 times until the data signals for the entire 4 mm×216 mm area are stored by columns in the memory 26.

After all of the data signals are stored by columns in the memory 26, they are read thereoutof by rows and fed to the compressor 16. More specifically, the switch 28 first connects the input of the compressor 16 to an output terminal for the first row y=1 of the memory 26. Clock pulses are applied to the memory 26 and compressor 16 causing the first row of data signals to be read out and fed to the compressor 16. In other words, the data signals d11 to dm1 are sequentially read out.

Then, the switch 28 connects the compressor 16 to an output terminal for the second row y=2 of the memory 26. In synchronism with the clock pulses the second row d12 to dm2 of data signals are read out. This process is continued until all of the data signals have been read out by rows.

For reception the switches 27 and 28 are disconnected from the video amplifier 12 and compressor 16 respectively and the switches 29 and 31 are connected to the output of the expander 21 and the input of the print drive unit 23 respectively. The switch 29 first connects the expander 21 to an input terminal for the first row y=1 of the memory 26 and the data signals are written into the data locations d11 to d1m of the memory 26. Then, the switch 29 connects the expander 21 to an input terminal for the second row y=2 of the memory 26 so that the next data signals are written into the locations d12 to dm2. This process is continued until all of the received data signals are stored in the memory 26 by rows.

Then, the switch 31 connects the print drive unit 23 to an output terminal for the first column x=1 of the memory 26 and the data signals in the locations d11 to d1n are read out. Next, the switch 31 connects the print drive unit 23 to an output terminal for the second column x=2 of the memory 26 and the data signals in the second column (d21 to d2n) are read out. This process is continued until all of the data signals are read out by columns.

In summary, the data signals are written into the memory 26 by columns and read out by rows for transmission, thus constituting orthogonal (rectangular) conversion. The data signals are written into the memory 26 by rows and read out by columns for reception, thus constituting reverse orthogonal conversion.

In practical application it is desired to reduce the memory capacity of the apparatus 11 by embodying the orthogonal conversion memory in the form of two rectangular memories of relatively small capacity which are switched back and forth during operation. While one memory is storing data the other is reading out data previously stored.

Figure 3:
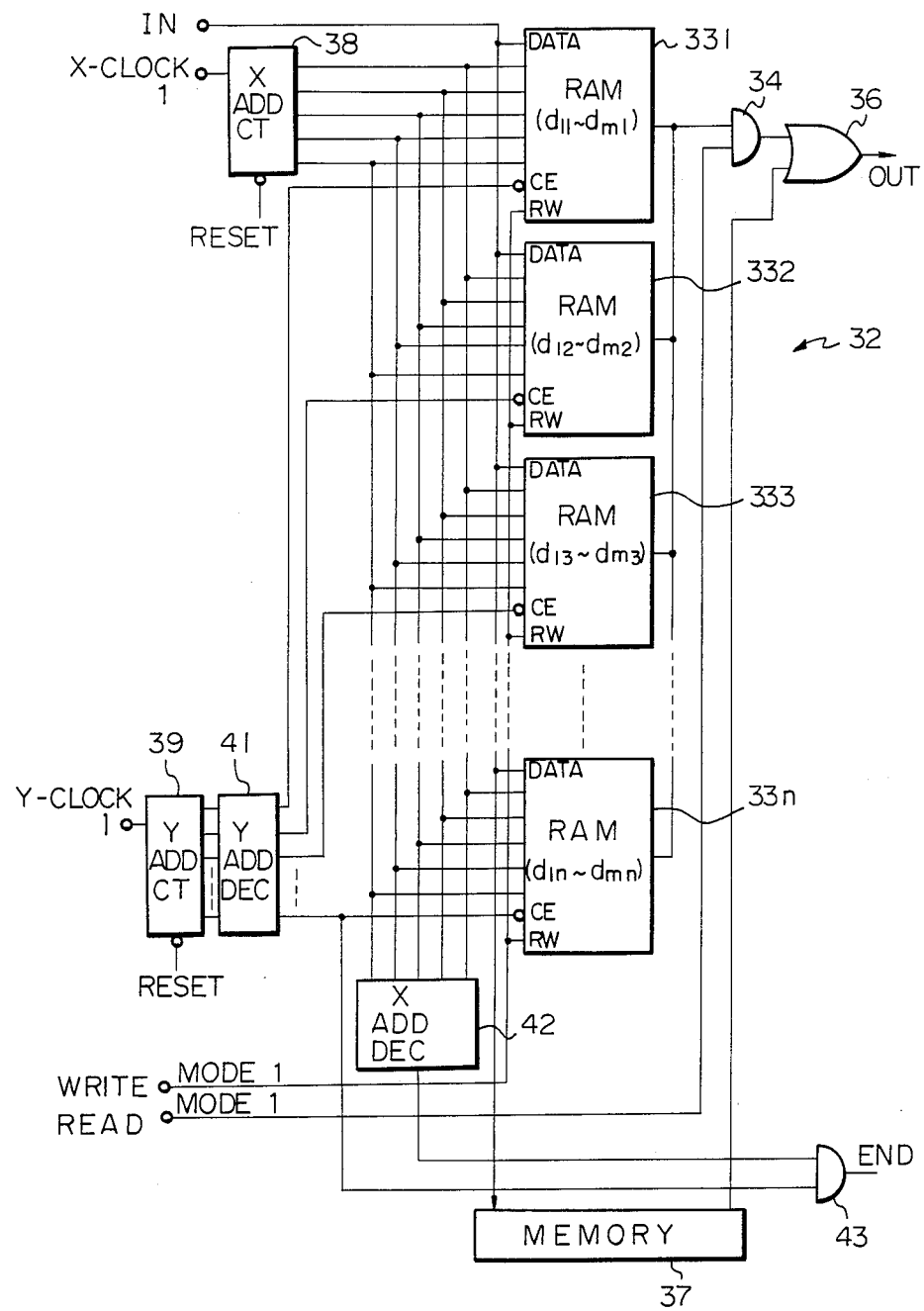
FIG. 3 is a block diagram of an orthogonal conversion memory.

A typical arrangement of this type comprises two rectangular memories which are shown in FIG. 3 and designated as 32 and 37. Each memory 32 and 37 has a capacity of 32 rows and 54 columns, or a total capacity of 1728 locations. The two memories 32 and 37 in combination have a capacity of 3456 locations, only 1/16th the capacity of the memory 26. This enables a major reduction in hardware and cost.

As viewed in FIG. 3, the memory 32 comprises 32 random-access memories (RAM) 33l to 33n, each having a capacity of 54 bits or memory locations. In this case, n=32 and m=54. The first RAM 331 constitutes the memory locations d11 to dm1, the second RAM the locations d12 to dm2, the RAM 33n the locations d1n to dmn, etc. The data outputs of all of the RAMs 33*l* to 33*n* are of the tri-state type and are OR-wired in a bus arrangement to an input of an AND gate 34. The output of the AND gate 34 is connected to an input of an OR gate 36, the output of which constitutes the output of the memory 32. Input data is applied to the data input terminals of all of the RAMs 33*l* to 33*n* and also to the corresponding RAMs of the memory 37, although not shown in detail. The memories 32 and 37 are identical. The data output of the memory 37 is applied to another input of the OR gate 36.

Each output of an X-address counter 38 is connected to a respective address input of all of the RAMs 33*l* to 33*n*. Since each RAM 33*l* to 33*n* has 54 locations, the X-address counter 38 has five outputs. Each combination of logically high outputs of the counter 38 selects a discrete location in the RAMs 33*l* to 33*n*.

Outputs of a Y-address counter 39 are connected to inputs of a Y-address decoder 41. The decoder 41 has 32 outputs which are connected to chip-enable inputs of the RAMs 33*l* to 33*n* respectively. Each RAM 33*l* to 33*n* will be turned off and produce a substantially infinite impedance output at zero signal level when the respective chip-enable input is logically low.

For transmission, it will be assumed that data signals are to be originally written into the memory 32. During this operation, the memory 37 is disabled. The counters 38 and 39 are reset. A high write mode 1 signal is applied to the read-write inputs of all of the RAMs 33*l* to 33*n* causing the RAMs 33*l* to 33*n* to operate in the write mode. A low read mode 1 signal is applied to the AND gate 34 which inhibits the same.

The count in the counter 38 is initially zero, so the locations d11 to d1n in the RAMs 33*l* to 33*n* are addressed respectively. The count in the counter 39 is also zero, enabling only the RAM 33*l*. This has the effect of addressing only the location d11 in the RAM 33*l*. Thus, the data signal appearing at the input of the RAMs 33*l* to 33*n* is written into the location d11 of the RAM 33*l*.

Next, a Y-clock 1 pulse is applied to the counter 39 causing the same to increment. This causes only the RAM 332 to be enabled. Thus, the next data signal is written into the location d12 of the RAM 332. This process is continued so that, in response to 32 Y-clock pulse 1 signals, the first 32 data signals are written into the locations d11 to d1n of the RAMs 33*l* to 33*n* respectively.

Then, an X-clock 1 pulse is fed to the counter 38 causing the same to increment. The outputs of the counter 38 will at this time address the locations d21 to d2n in the RAMs 33*l* to 33*n* respectively. The counter 39 has overflowed to the count of zero, and thereby enables the RAM 33*l*. Thus, the memory location d21 is enabled and the next data signal written therein. Application of 32 more Y-clock 1 pulses will cause the second 32 data signals to be written into the locations d21 to d2n in the RAMs 33*l* to 33*n* respectively. A total of 54 X-clock 1 pulses are applied to the counter 38, each X-clock 1 pulse alternating with 32 Y-clock 1 pulses. This results in the 1728 data signals being written into the respective memory locations d11 to dmn by columns in the manner described above.

After the writing operation is completed, the memory 32 is switched to the read mode and the memory 37 is switched to the write mode. The memory 37 stores the next 1728 data signals while the memory 32 outputs the first 1728 data signals. Termination of either a write operation or read operation in the memory 32 is detected by means of an X-address decoder 42 and an AND gate 43. The output of the Y-address decoder 41 which is connected to the chip-enable input of the RAM 33*n* is also connected to an input of the AND gate 43. The decoder 42 produces a high output at the maximum count (53) of the counter 38 at which time the memory locations dml to dmn are addressed thereby. Both inputs to the AND gate 43 are high when the last memory location dmn is addressed. Thus, a high output from the AND gate 43 indicates this fact and is fed to a control circuit (not shown) to indicate that the memory function should be switched.

The memory 32 is operated in the read mode during transmission as follows.

The write mode 1 signal is made low thus switching the RAMs 33*l* to 33*n* from the write to the read function. The read mode 1 signal is made high thus enabling the AND gate 34. The counters 38 and 29 are reset to address the first location d11.

Figure 4B:
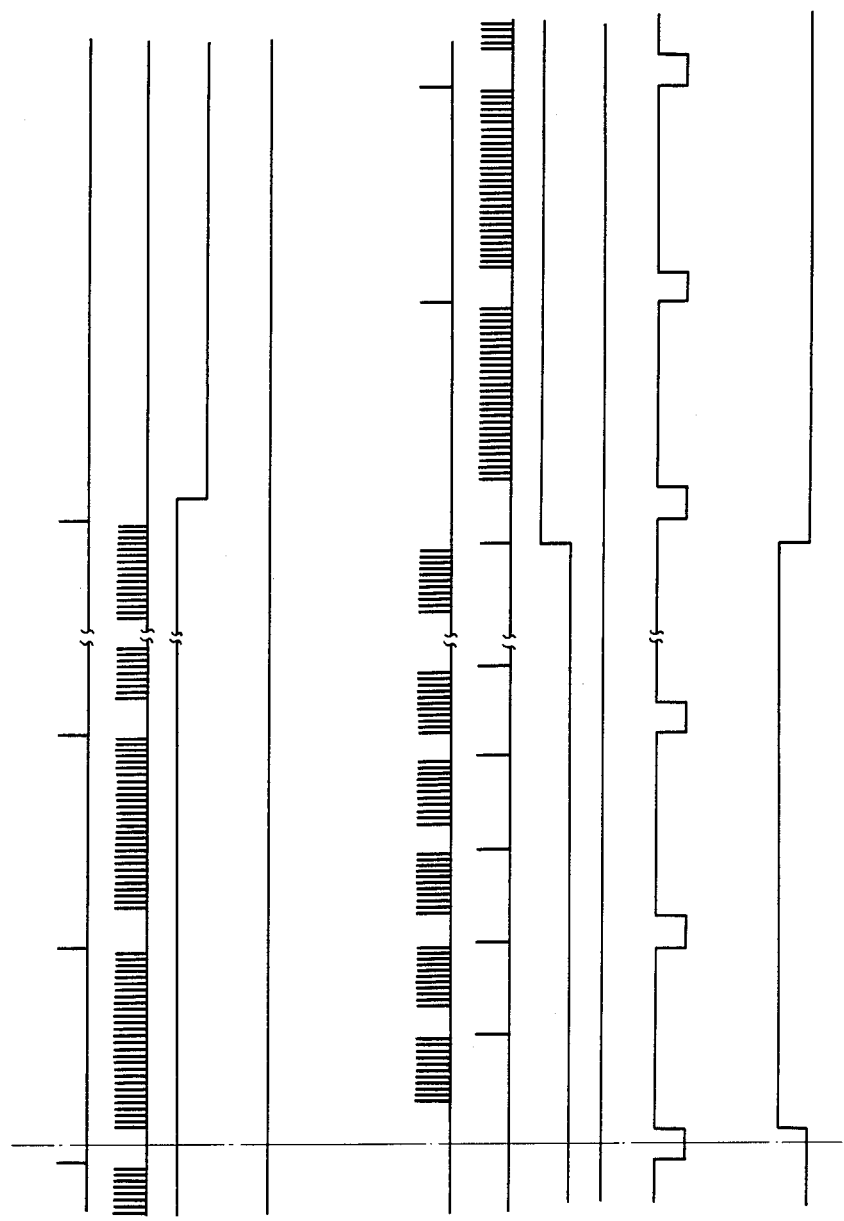

The operation of the memory 32 will be better understood with reference being made also to FIGS. 4*a* and 4*b*. With the location d11 addressed, the data signal therein will be output through the AND gate 34 and OR gate 36. The next signal applied to the memory 32 is an X-clock 1 signal which addresses the locations d21 to d2n. However, since the decoder 41 enables only the RAM 33*l*, the only location which can actually produce an output is the location d21. The next X-clock pulse 1 will increment the counter 38 and address the location d31. A total of 54 X-clock 1 pulses are applied to sequentially address the locations d11 to dml and read out the first row of data signals.

Then, a Y-clock 1 pulse is applied to increment the counter 39 and enable the RAM 332. 54 more X-clock 1 pulses are applied to output the data signals in the second row (locations d12 to dm2). This process is continued until all of the data signals are output by columns. The memories 32 and 37 are operated alternatingly in the read and write modes. While one of the memories 32 and 37 is being operated in the read mode, the other of the memories 32 and 37 will be operated in the write mode. Each memory 32 and 37 will be operated in the read mode 16 times and in the write mode 16 times.

The operation of the memories 32 and 37 in the reception mode is opposite to the operation in the transmission mode. For writing the data signals into the memory 32 by rows, the memory 32 is switched to the write mode and 32 Y-clock 1 pulses are applied thereto, each Y-clock 1 pulse being alternated with 54 X-clock 1 pulses. For reading data out of the memory 32 by columns, the memory 32 is switched to the read mode and 54 X-clock 1 pulses are applied, each X-clock 1 pulse being alternated with 32 Y-clock 1 pulses. Further illustrated in FIGS. 4*a* and 4*b* are Y-clock 2, X-clock 2, read mode 2 and write mode 2 signals for the memory 37 which correspond to the signals for the memory 32 and compression enable and compression operate signals for the compressor 16.

Figure 5:
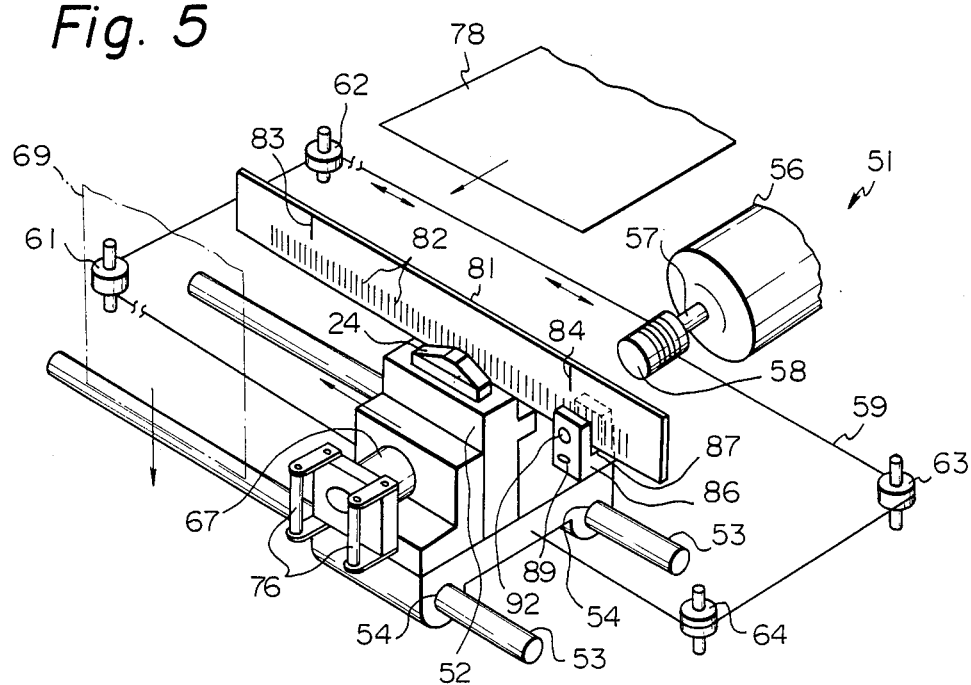
FIG. 5 is a perspective view of a combination scanning and printing head of the present invention.
Figure 6:
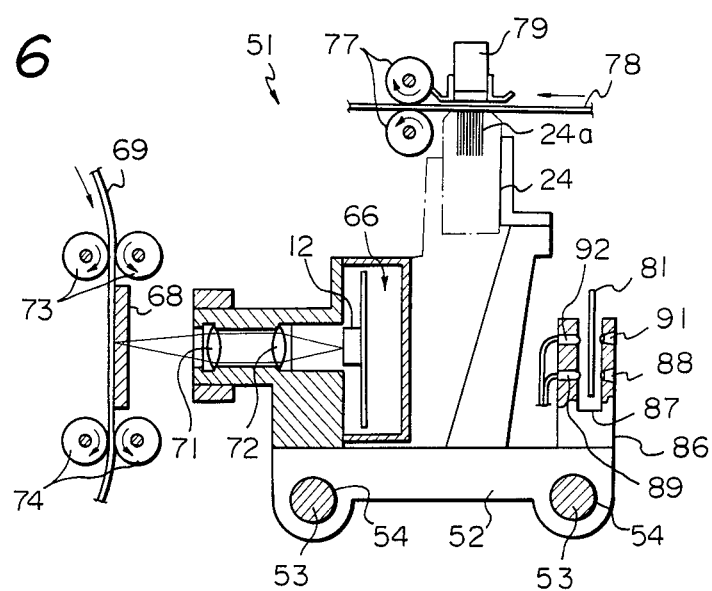
FIG. 6 is a side sectional view of the printing head.

Referring now to FIGS. 5 and 6, a combination scanning and printing head is generally designated as 51 and comprises a block 52 which is slidably supported for linear movement by rods 53 which pass through bores 54 formed through the lower portion of the block 52. The block 52 is driven for reciprocating linear movement from a servo motor 56 having a rotary shaft 57 on which is fixed a cylindrical spool 58. A cable or wire 59 is connected at its opposite ends to the opposite ends of the block 52 respectively and is trained around pulleys 61, 62, 63 and 64. The wire 59 is further wound around the spool 58 several times. Although not shown, a tension means may be provided to maintain the wire 59 taut and prevent it from slipping on the spool 58.

Figure 7:
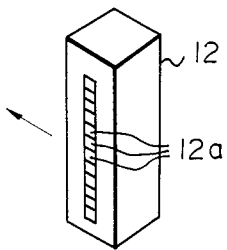
FIG. 7 is a perspective view of a scanning array of the present invention.

As best seen in FIGS. 6 and 7, the scanning array 12 is mounted in a light-tight chamber 66 formed in the block 52. The chamber 66 opens through a tube 67 toward a transparent platen 68. Presser means (not shown) resiliently press an original document 69 against the platen 68 with the image bearing surface of the document 69 facing the tube 67. Converging lenses 71 and 72 focus a light image of part of the document 69 onto the array 12, the lenses 71 and 72 being fixedly mounted in the tube 67. The axis 12b of the array 12 is oriented vertically as viewed in FIG. 6. Feed rollers 73 and 74 are provided to feed the document 69 downwardly by incremental distances of 4 mm as will be described in detail below. Further illustrated are lamps 76 which are fixedly mounted at the end of the tube 67 for illuminating the document 69 through the platen 68.

Figure 8:
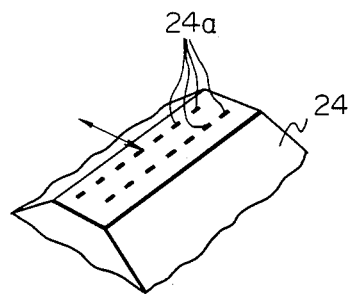
FIG. 8 is a perspective view of a printing array of the present invention.

The printing array 24 which is shown in FIG. 8 is fixedly mounted on top of the block 62. Feed rollers 77 feed a sheet of printing or copy paper 78 which constitutes a printing surface over the array 24 in increments of 4 mm. A presser 79 presses the paper 78 into engagement with the array 24. As viewed in FIG. 6, the rollers 77 feed the sheet 78 leftwardly and the axis 24b of the array 24 is oriented horizontally.

Fixedly mounted adjacent to the block 52 is a clock plate 81. The plate 81 is elongated parallel to the axes of the rods 53 and is formed with a lower pattern of alternating opaque and transparent or translucent areas. The opaque areas are designated as clock marks 82 and are formed at intervals of ⅛ mm (there are 8 clock marks 82 per millimeter). Although only a few of the marks 82 are labeled in the drawing, there are 1728 marks 82 formed on the plate 81 between a left edge mark 83 and a right edge mark 84. In addition, there are a number of marks 82 leftward and rightward of the marks 83 and 84 respectively. The plate 81 may be formed by a photographic process, etching, etc.

Further fixedly mounted on the block 52 is a sensor mount block 86 formed with an elongated vertical slot 87. The inner walls of the slot 87 embrace the clock plate 81 without touching the same. A lower light source 88 such as a light emitting diode and a lower photosensor 89 such as a phototransistor or photodiode are mounted on the right and left walls of the slot 87 as viewed in FIG. 6 at the level of the marks 82. An identical upper light source 91 and photosensor 92 are mounted on the right and left walls of the slot 87 at the level of the marks 83 and 84.

The sensors 89 and 92 produce electrical signals corresponding to the intensity of light transmitted through the clock plate 81.

For transmission, the block 52 is moved to a leftmost position as viewed in FIG. 5 and the document 69 is positioned by the rollers 73 and 74 so that an uppermost portion thereof is pressed against the platen 68 at the axis of the tube 67. Then, the motor 56 is energized to move the block 52 rightwardly. The relationship between the array 12 and mark 83 and sensor 92 is such that the mark 83 will be sensed by the sensor 92 as an image of the left edge of the document 69 is focussed on the array 12 by the lenses 71 and 72. As the block 52 moves relative to the clock plate 81, the sensor 89 produces an electrical pulse each time it senses one of the marks 82. These pulses are fed to the array 12. Each pulse causes the array 12 to self-scan and produce output data signals from each of the photosensor elements. In other words, in response to each pulse the array 12 will produce 32 data signals. In the symbolic embodiment of FIG. 2, each pulse produced in response to sensing of a mark 82 causes the selector switch 27 to step from one position to the next position.

The mark 84 is sensed by the sensor 92 as the image of the right edge of the document 69 is focussed on the array 12. At this time, 1728 marks 82 have been sensed and all of the data signals stored in the orthogonal conversion memory means. In response to the signal produced by sensing the mark 84, the motor 56 is reversed to return the block 52 to the leftmost position. During this time or thereafter the rollers 73 and 74 are energized to move the document 69 downwardly by 4 mm. The block 52 is then driven rightwardly to scan the next 4 mm ×216 mm area of the document 69. This process is continued until the entire document 69 has been scanned.

The arrangement shown in FIG. 5 is advantageous in that it precludes any positional scanning error due to variation in the speed of movement of the block 52, bending or slipping of the wire 59, etc. Each pulse produced by sensing a mark 82 corresponds in position to the mark 82. Thus, each subscan operation by the array 12 occurs at absolutely the correct position, which is the position of the mark 82.

The operation for reception is substantially identical to the operation for transmission except that the printing array 24 is energized for printing rather than the scanning array 12 being energized for scanning. The block 52 is initially moved to its leftmost position and the rollers 77 driven to position the upper 4 mm area of the paper 78 above the printing array 24. The block 52 is then moved rightwardly so that the printing array 24 moves under the surface of the paper 78 in engagement therewith. The mark 83 is sensed as the array 24 moves under the left edge of the paper 78. In response to the pulses produced by sensing the marks 82, the elements 24a of the array 24 are energized to induce an electrostatic charge pattern on the paper 78. In response to each pulse, the elements 24a are energized either in sequence or simultaneously to induce the charge pattern on the paper 78.

After the right edge of the paper 78 is reached and the mark 84 is sensed, the motor 56 is reversed to move the block 52 back to the leftmost position. Then, the rollers 77 are energized to move the paper 78 leftwardly by 4 mm to print the next 4 mm ×216 mm area on the paper 78.

The printing elements 24a may be arranged either in a single row or in two or more rows, with the elements 24a in adjacent rows being alternatingly spaced along the axis 24b, of the array 24. The array 24 may further comprise back electrodes (not shown) to produce an electric discharge in combination with the elements 24a.

Figure 9:
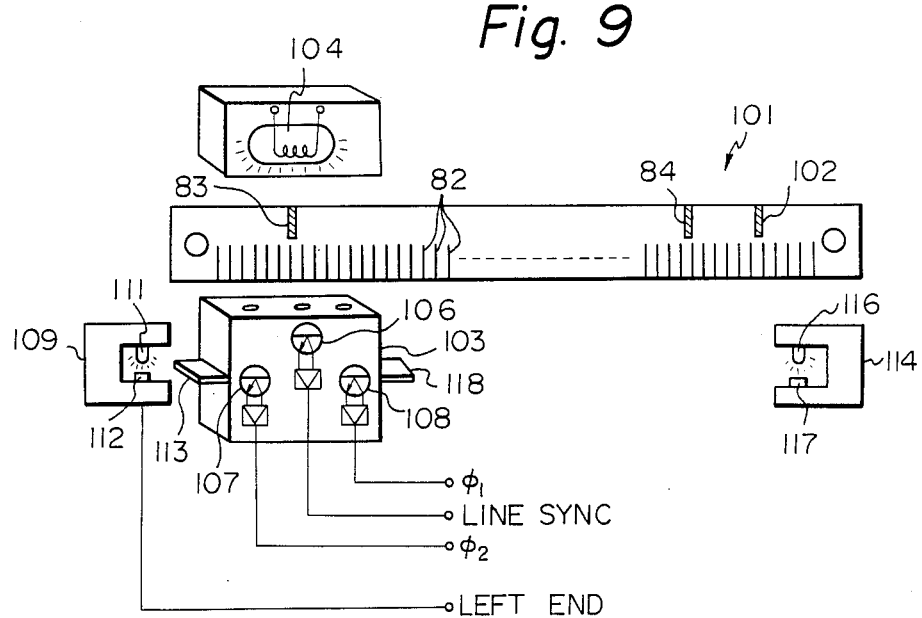
FIG. 9 is a schematic view of a modified scanning and printing head of the present invention.

A modified version of the head 51 is illustrated in FIG. 9 and designated as 101. Like elements are designated by the same reference numerals and will not be described repetitiously. The clock plate 81 is modified and designated as 81' by having another upper mark 102 formed thereon. The mark 102 indicates the right edge position of a B4 document or sheet of printing paper.

The block 52 is replaced by a block 103. In addition, the light sources 88 and 91 are replaced with a single light source 104 which may be either fixed in position or moved along with the block 103. Preferably, the light source 104 is moved along with the block 103 since this enables the light source 104 to be shorter.

A photosensor 106 provides the same function as the photosensor 92 for sensing the upper marks 83, 84 and 102. The single photosensor 89 is replaced by two photosensors 107 and 108 which are horizontally spaced from each other by a small distance. The photosensors 108 and 107 produce pulses ∅1 and ∅2 respectively in response to sensing the marks 82.

A photosensor unit 109 comprises a light source 111 and a photosensor 112. The unit 109 produces a left end signal when the block 103 is in its leftmost position at which a lug 113 fixed to the left end of the block 103 intervenes between the light source 111 and sensor 112. Another photosensor unit 114 produces an output when the block 103 reaches a rightmost position and mainly serves an error function since the block 103 should never reach the rightmost position during normal operation. The apparatus is preferably disabled and an annunciator (not shown) energized in response to a signal from the unit 114. The unit 114 comprises a light source 116 and photosensor 117 and produces an output when a lug 118 fixed to the right end of the block 103 intervenes between the light source 116 and sensor 117. The pulses ∅1 and ∅2 are different in phase from each other and enable determination of the direction of movement of the block 103. In order to ensure that the sensors 106, 107 and 108 produce clean pulse outputs, they are mounted as close as possible to the clock plate 81'.

Figure 10:
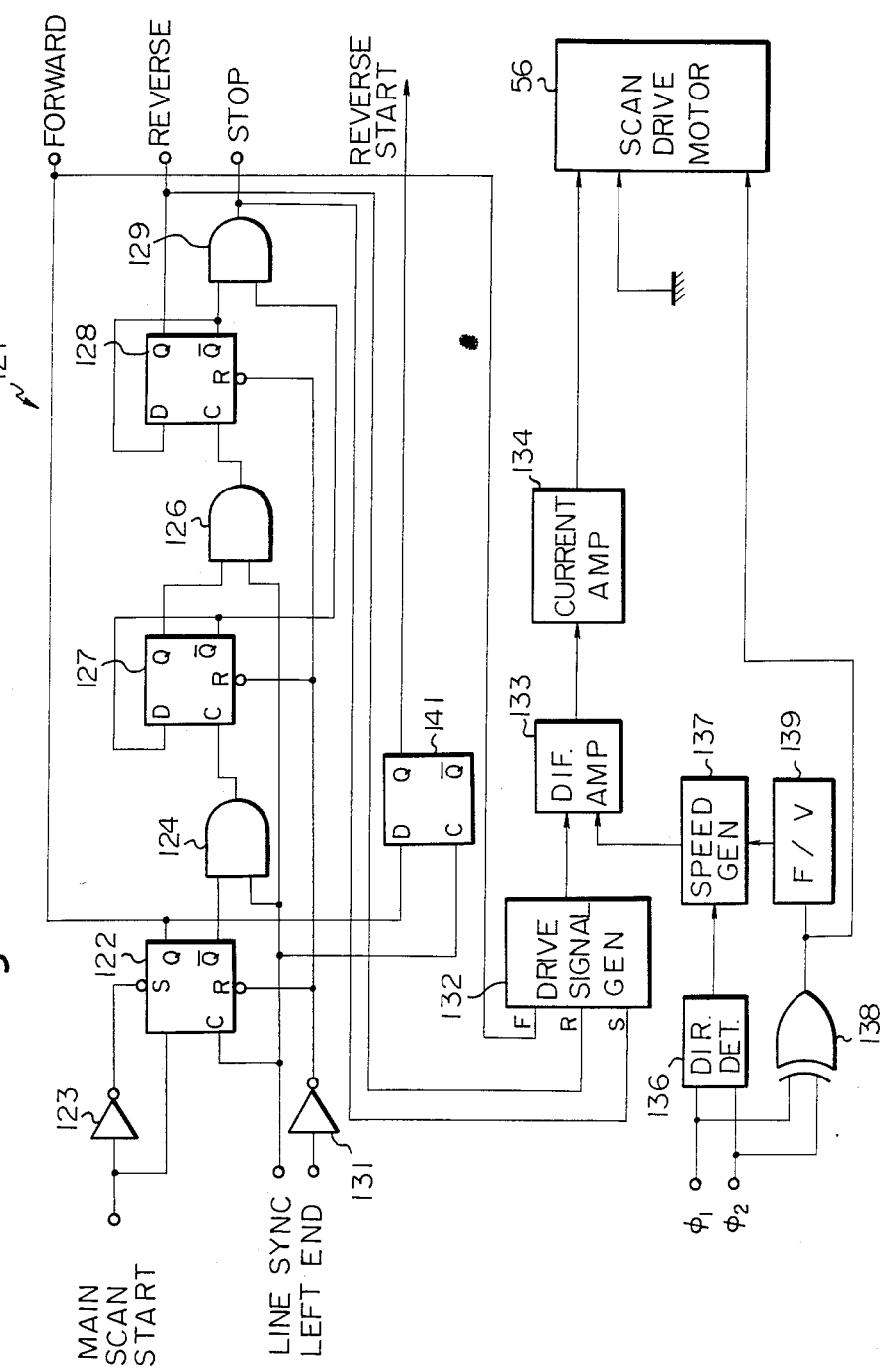
FIG. 10 is a schematic diagram of a main scan motor controller of the present invention.
Figure 13:
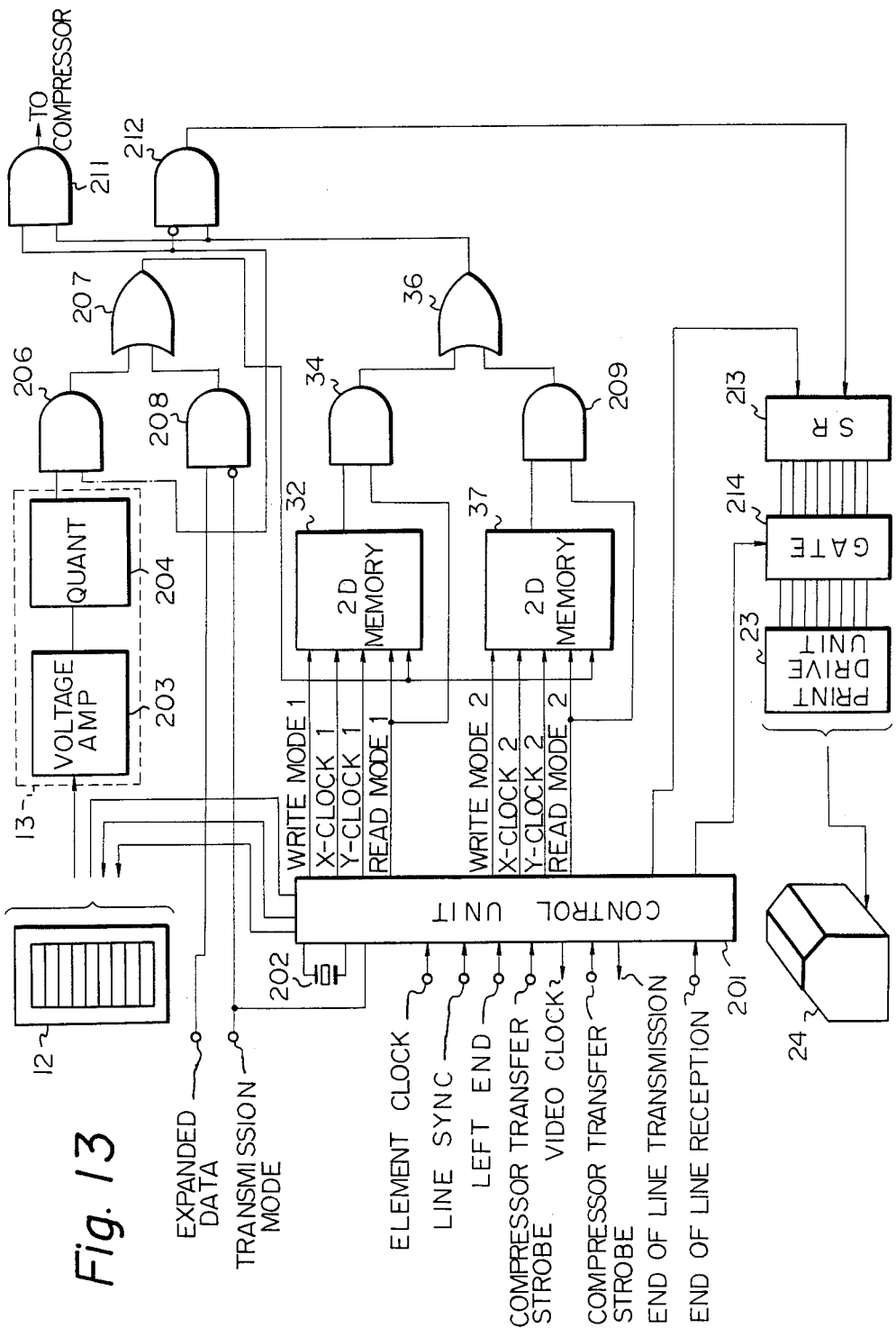
FIG. 13 is a schematic diagram of a control circuit of the present invention.

FIG. 10 illustrates a scan motor control unit 121 for controlling the scan drive motor 56 in response to the output signals of the head 101. A main scan start signal from a control unit which will be described later with reference to FIG. 13 is applied to the D input of a D-type flip-flop 122 and also to an inverting set input of the flip-flop 122 through an inverter 123. The output of the sensor 106 is connected to the clock input of the flip-flop 122 and also to inputs of AND gates 124 and 126. The $\bar{Q}$ output of the flip-flop 122 is connected to another input of the AND gate 124, the output of which is connected to the clock input of a D-type flip-flop 127.

The flip-flop 127 is connected as a toggle flip-flop with the $\bar{Q}$ output connected to the D input thereof. The Q output of the flip-flop 127 is connected to another input of the AND gate 126, the output of which is connected to the clock input of another D-type flip-flop 128. The flip-flop 128 is also connected as a toggle flip-flop with the $\bar{Q}$ output connected to the D input thereof. The $\bar{Q}$ output of the flip-flop 128 is also connected to an input of an AND gate 129. The output of the unit 109 is connected through an inverter 131 to inverting reset inputs of the flip-flops 122, 127 and 128. The Q output of the flip-flop 122 constitutes a forward signal when logically high. The Q output of the flip-flop 128 constitutes a reverse signal when logically high. The output of the AND gate 129 constitutes a stop signal when logically high. The forward, reverse and stop signals are applied to a drive signal generator 132, the output of which is connected to an input of a differential voltage amplifier 133. The output of the differential amplifier 133 is connected through a current amplifier or power booster 134 to the scan drive motor 56.

The outputs of the sensors 107 and 108 are connected to inputs of a direction detector 136, the output of which is connected to an input of a speed signal generator 137. The outputs of the sensors 107 and 108 are also connected to inputs of an exclusive OR gate 138, the output of which is connected to a frequency-to-voltage converter 139. The converter 139 may be a tachometer or a solid state device. The output of the converter 139 is connected to another input of the speed signal generator 137, the output of which is connected to another input of the differential amplifier 133.

Figure 11:
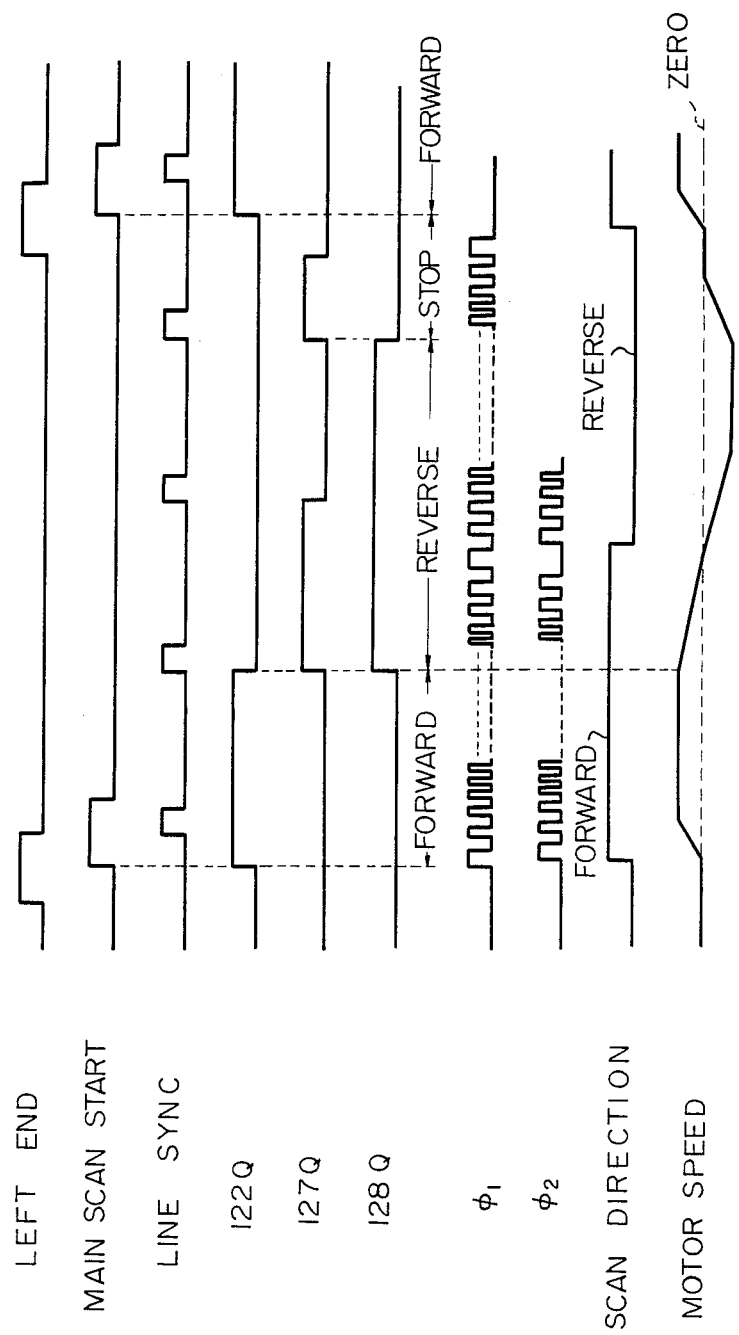
FIG. 11 is a timing diagram illustrating the operation of the scan motor controller.

The operation of the unit 121 will now be described, assuming that the document 69 and paper 78 are each of A4 size. The flip-flops 122, 127 and 128 are initially reset. The leading edge of the main scan start signal sets the flip-flop 122 as illustrated in FIG. 11. The Q output of the flip-flop 122 goes high, producing the forward signal which is applied to the generator 132. The generator 132 produces a positive signal which is fed to the differential amplifier 133. Since the speed of movement of the block 103 is initially zero, the output of the speed signal generator 137 is zero and the positive signal is applied through the current amplifier to the motor 56. This causes the motor 56 to be energized to accelerate the block 103 rightwardly in the scanning or forward direction. The unit 121 is designed so that the block 103 will reach a maximum constant speed when the mark 83 is sensed by the sensor 106.

The direction detector 136 receives the pulses ∅1 and ∅2 and determines the direction of movement of the block 103 from the relative phase thereof. If the block 103 is moving in the forward direction, the leading edges of the pulses ∅1 will occur before the leading edges of the pulses ∅2 and vice-versa. The direction detector 136 produces a logically high output when the head 103 is moving in the forward direction and a logically low output when the head 103 is moving in the leftward or reverse direction.

The exclusive OR gate 138 produces a logically high output whenever either one but not both of the inputs ∅1 and ∅2 is logically high. The gate 138 thereby produces pulses at twice the frequency of the pulses ∅1 and ∅2 which are identical in either direction of movement of the block 103. The generator 139 produces an output signal having a magnitude proportional to the frequency of the output of the gate 138. The speed signal generator 137 produces an output signal having a magnitude equal or proportional to the magnitude of the output signal of the converter 139 and having a polarity corresponding to the direction of movement of the block 103. The polarity will be positive for forward movement and vice-versa.

The differential amplifier 133 functions as a speed comparator and compares the output of the generator 132, which constitutes a command speed, with the output of the generator 137 which constitutes an actual speed. With the forward signal applied to the generator 132 from the Q output of the flip-flop 122, the generator 132 produces a positive signal corresponding to the maximum constant speed of movement of the block 103. Whenever the actual speed of the block 103 is lower than the command speed, the differential amplifier 133 will produce a positive output causing the motor 56 to be energized in the forward direction. If the actual speed of the block 103 should exceed the command speed, the differential amplifier 133 will produce a negative output causing the motor 56 to be energized in reverse and function as a brake.

A first line sync pulse generated in response to sensing of the mark 83 by the sensor 106 has no effect on the unit 121. Since the main scan start signal is still high and is applied to the D input of the flip-flop 122, the Q output of the flip-flop 122 will remain high. The low $\bar{Q}$ output of the flip-flop 122 inhibits the AND gate 124 and prevents the flip-flop 127 from changing state or toggling. The low Q output of the flip-flop 127 inhibits the AND gate 126 preventing the flip-flop 128 from changing state.

The next line sync signal is produced when the mark 84 is produced by the sensor 106. This signal resets the flip-flop 122 since the main scan start signal has been terminated. The $\bar{Q}$ output of the flip-flop 122 goes high during the duration of the line sync pulse, thereby causing the output of the AND gate 124 to go high. The high output of the AND gate 124 causes the flip-flop 127 to change state due to the toggle connection. The Q output of the flip-flop 127 goes high during the duration of the line sync pulse so that the output of the AND gate 126 goes high. This causes the flip-flop 128 to change state.

The Q output of the flip-flop 128 goes high thereby constituting the reverse signal which is applied to the generator 132. The generator 132 produces a negative signal corresponding to a maximum reverse speed of movement of the block 103. The actual speed (still forward) is subtracted from the negative command speed by the differential amplifier 133 which produces a negative signal having a magnitude equal to the sum of the inputs. This high negative signal is applied to the motor 56 causing it to quickly reverse direction.

As the motor 56 stops and thereafter reverses direction, the output of the speed generator 137 goes negative. As the block 103 accelerates in the reverse direction, the actual speed approaches the command speed and the magnitude of the output of the differential amplifier 133 decreases (although the polarity thereof remains negative).

The next line sync pulse is produced when the mark 84 is again sensed by the sensor 106. The mark 84 is sensed twice since the sensor 106 overshoots the mark 84 before the direction of movement of the block is reversed. This next (third) line sync pulse causes the flip-flop 127 to change state. However, the Q output of the flip-flop 128 remains high to command reverse movement.

The fourth line sync pulse is produced when the mark 83 is sensed by the sensor 106 and causes the flip-flop 127 to toggle to the set state. At this time, none of the forward, reverse or stop signals is logically high and the differential amplifier 133 produces no output. When block 103 reaches the leftmost position the unit 109 produces a left end signal which resets all of the flip-flops 122, 127 and 128. The low $\bar{Q}$ outputs of the flip-flops 127 and 128 cause the AND gate 129 to produce a high signal which constitutes the stop signal. The drive signal generator 132 produces a zero signal output causing the motor 56 to stop movement of the block 103. Since the block 103 is moving leftwardly the generator 137 produces a negative output. This is subtracted from the zero output signal of the generator 132 by the differential amplifier 133 which produces a positive signal. This positive signal brakes the motor 56 to stop and hold the block 103 in the leftmost position.

Further illustrates is a D-type flip-flop 141 which indicates when the mark 84 is sensed by the sensor 106 for the second time and is used in a case where the apparatus is adapted to scan or print during both forward and reverse movement. In other words, the flip-flop 141 indicates the beginning of scanning or printing in the reverse direction. The D input of the flip-flop 141 is connected to the Q output of the flip-flop 122. The line sync pulses from the sensor 106 are applied to the clock input of the flip-flop 141. The flip-flop 141 is set by the first line sync pulse and is unchanged by the second line sync pulse since the Q output of the flip-flop 122 is high at the time of generation thereof. However, the flip-flop 122 is reset by the second line sync pulse and the Q output thereof goes low. The low Q output of the flip-flop 122 causes the flip-flop 141 to be reset by the third line sync pulse, thus indicating the starting point of reverse scan or print.

Figure 12:
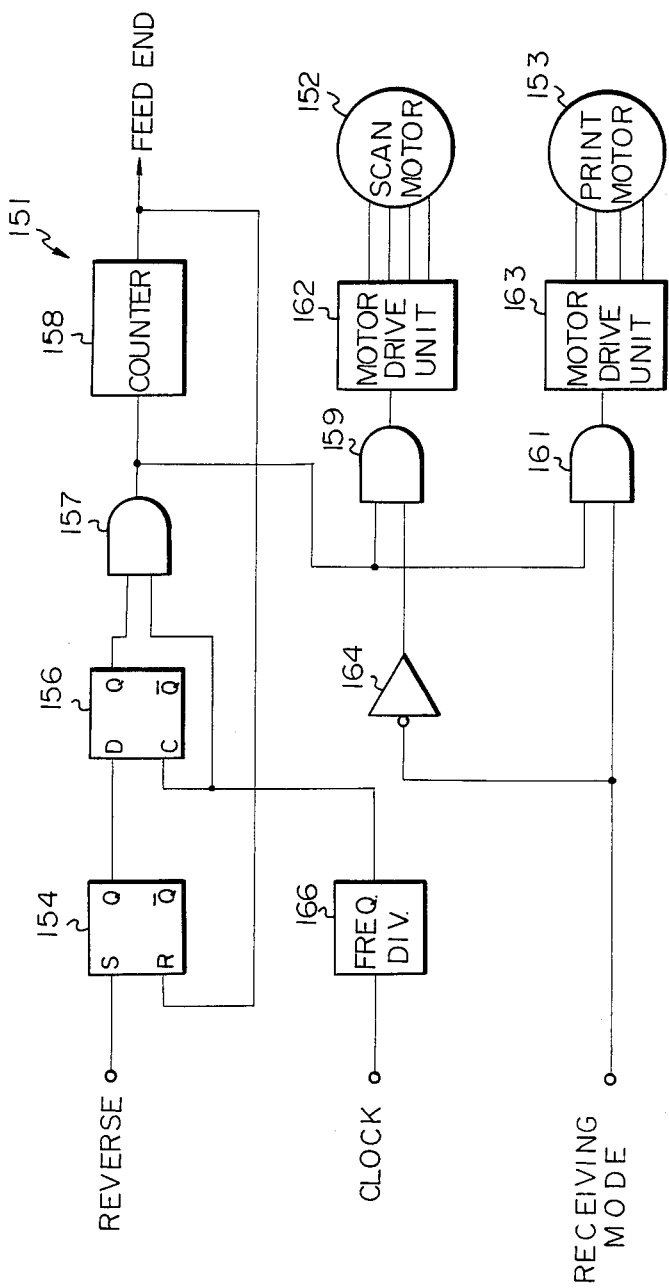
FIG. 12 is a schematic diagram of subscan motor controller of the present invention.

FIG. 12 illustrates a control circuit 151 for controlling a scan drive motor 152 and a print drive motor 153 to move the document 69 and paper 78 in 4 mm increments as required. The motor 152 rotatably drives the rollers 73 and 74. The motor 153 rotatably drives the rollers 77.

The Q output of the flip-flop 128 of the control unit 121 which constitutes a reverse signal is applied to the set input of a set-reset flip-flop 154. The Q output of the flip-flop 154 is connected to the D input of a D-type flip-flop 156. The Q output of the flip-flop 156 is connected to an input of an AND gate 157, the output of which is connected to inputs of a counter 158, an AND gate 159 and another AND gate 161. The outputs of the AND gates 159 and 161 are connected to inputs of motor drive units 162 and 163, the outputs of which are connected to the motors 152 and 153 respectively. A receiving mode signal is applied directly to an input of the AND gate 161 and through an inverter 164 to an input of the AND gate 159. The output of the counter 158 is connected to the reset input of the flip-flop 154. Clock pulses from a suitable source are applied to an input of a frequency divider 166, the output of which is connected to the clock input of the flip-flop 156 and an input of the AND gate 157.

The flip-flops 154 and 156 are initially reset. When the flip-flop 128 produces the reverse signal upon sensing of the mark 84 by the sensor 196, the flip-flop 154 is set. The next frequency divided clock pulse from the divider 166 sets the flip-flop 156 since the high Q output of the flip-flop 154 is applied to the D input of the flip-flop 156. The Q output of the flip-flop 156 goes high, enabling the AND gate 157. Thus, the AND gate 157 gates the clock pulses from the divider 166 to the counter 158 and AND gates 159 and 161.

When the apparatus is in the transmission mode, the receiving mode signal is low, the AND gate 159 is enabled through the inverter 164 and the AND gate 161 is inhibited. Thus, the pulses from the AND gate 157 are gated through the AND gate 159 to the motor drive unit 162. In the reception mode, the AND gate 159 is inhibited and the AND gate 161 enabled to gate the pulses to the motor drive unit 163. Both the motors 152 and 153 are pulse motors and are constructed to rotate the shafts thereof (not shown) through a predetermined angle in response to each applied pulse.

The pulses from the AND gate 157 are applied to the motor 152 or 153 to drive the same and feed the document 69 or paper 78 respectively. The pulses are also applied to the counter 158 which counts the same. When the number of applied pulses equals the modulo of the counter 158, the counter 158 overflows, producing a carry signal which resets the flip-flop 154. The carry signal indicates the end of the operation of feeding the document 69 or paper 78 in the subscan direction. The low Q output of the flip-flop 154 applied to the D input of the flip-flop 156 causes the next clock pulse from the divider 166 to reset the flip-flop 156 and inhibit the AND gate 157. This prevents any more pulses from being applied to the motor 152 or 153.

The frequency division ratio of the divider 166 and the modulo of the counter 158 are selected so that between the time the flip-flop 156 is set and the time the flip-flop 156 is subsequently reset the proper number of pulses will be fed to the motor 152 or 153 to cause the document 69 or paper 78 to be fed in the vertical (subscan) direction by 4 mm.

FIG. 13 illustrates an overall control arrangement for the present facsimile transceiver 11. The arrangement comprises a control unit 201 which includes a clock pulse generator (not shown) controlled by a crystal 202 and various inputs and outputs which are labeled in the drawing. The video amplifier 13 comprises a voltage amplifier 203 and a quantizer 204 which produces a logically high or low output when the output of the voltage amplifier 203 is above or below a predetermined threshold value respectively. The output of the quantizer 204 is connected to an input of an AND gate 206, the output of which is connected to an input of an OR gate 207. The output of the OR gate 207 is connected to the data inputs of the memories 32 and 37.

Data from the expander 21 is applied to an input of an AND gate 208, the output of which is connected to another input of the OR gate 207. A transmission mode signal is applied to an inverting input of the AND gate 208. The read mode 1 and read mode 2 signals are applied to inputs of the AND gate 34 and an AND gate 209 respectively. The data output of the memory 37 is connected to another input of the AND gate 209. The output of the OR gate 36 is connected to inputs of AND gates 211 and 212. The transmission mode signal is applied to an input of the AND gate 211 and to an inverting input of the AND gate 212. The output of the AND gate 211 is connected to the input of the compressor 16. The output of the AND gate 212 is connected to an input of a serial-in, parallel-out shift register 213 which serves as a serial to parallel converter. The parallel outputs of the shift register 213 are connected through a gate 214 to the print drive unit 23.

For transmission, the transmission mode signal is high, enabling the AND gates 206 and 211 and inhibiting the AND gate 208 and 212. The data from the scanning array 12 is gated to the memories 32 and 37 through the AND gate 206 and OR gate 207. The control unit 201 operates the memories 32 and 37 alternatingly in the manner described hereinabove to store the data signals by columns and read them out by rows. The data signals are read out of the memories 32 and 37 and gated through the OR gate 36 and AND gate 211 to the compressor 16.

For reception, the transmission mode signal is low, the AND gates 208 and 212 are enabled and the AND gates 206 and 211 are inhibited. The expanded data signals from the expander 21 are gated through the AND gate 208 and OR gate 207 to the memories 32 and 37 which store the data by rows and read it out by columns in the manner described hereinabove. The data signals are gated from the memories 32 and 37 through the OR gate 36 and AND gate 212 to the shift register 213.

The shift register 213 has a capacity of 32 bits and stores the data signals for one vertical 4 mm image segment. After the signals have been stored in the shift register 213, the control unit 201 enables the gate 214 so that the data signals are applied in parallel to the elements 24a of the array 24.

In summary, it will be seen that the present invention overcomes the drawbacks of the prior art and provides a facsimile transceiver which comprises a relatively small number of component parts and is inexpensive to manufacture on a commercial production basis. Although the present apparatus comprises a scanning head with only a small number of elements arranged in the length direction of an original document, the novel orthogonal conversion process increases the run lengths so as to provide a compression efficiency comparable to that of more expensive apparatus comprising many more photosensor elements and complicated circuitry. The small number of printing elements reduces the effects of ghosts during printing and improves the printing resolution. As yet another advantage, the small scanning array requires only a small illumination light source which operates with small power consumption.

Various modifications will become possible for those skilled in the art after receiving the teachings of the present disclosure without departing from the scope thereof. For example, although the scanning array has been described as comprising only one row of photosensor elements, it may be adapted to comprise two or more rows of photosensor elements arranged either in a rectangular or zig-zag configuration. As another modification, the axes of the scanning and printing arrays may be oriented at an angle other than 90° to the direction of movement thereof, or be skewed relative to the edges of the document and paper. As yet another modification, the servo motor 56 may be replaced by a pulse motor and suitable drive circuitry.

Figure 14:
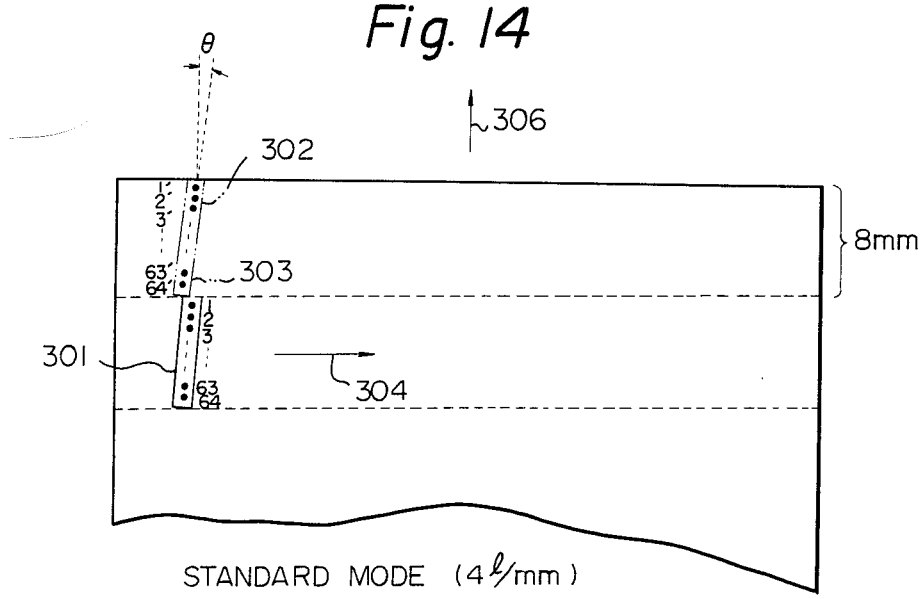
FIGS. 14 and 15, are diagrams illustrating different line scan densities and a slanting arrangement of a scanning array.
Figure 15:
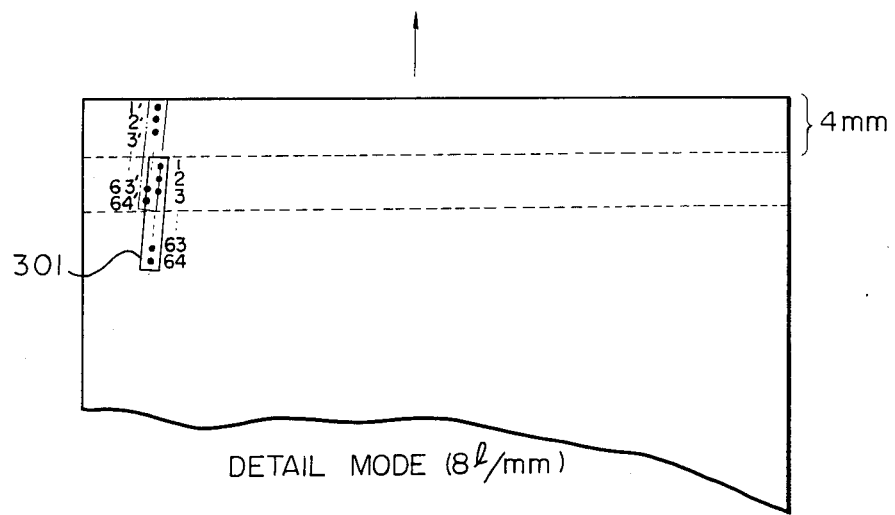

A modified arrangement of the present invention is illustrated in FIGS. 14 and 15. It is within the scope of the present invention to provide a photosensor scanning array 301 which has 64 photosensor elements rather than 32 and operate the array in either a standard or detail mode. In the detail mode, the line density is twice that in the standard mode.

In the standard mode, the output data signals of alternating photosensor elements are used, i.e., the outputs of the 1st, 3rd, 5th . . . 63rd elements. Thus, the result is that 32 data signals are produced as in the previous embodiment. In the detail mode, the output data signals of the first 32 photosensor elements are used, resulting in a line density which is twice that of the standard mode. In the standard mode, one scan results in the scanning of an area having a vertical dimension of, for example, 8 mm. In the detail mode, one scan results in the scanning of an area having a vertical dimension of 4 mm. Naturally, twice as many scans are required in the detail mode as in the standard mode, resulting in twice the line scan density and resolution and approximately twice the scanning time.

Rather than merely compress the alternating data signals themselves in the standard mode, it is within the scope of the present invention to operate thereon logically to produce improved apparent resolution. Desirable results have been obtained by subjecting the data signals in the standard mode to the following logical operation $$ODD + \overline{Y} \times \overline{ODD} \times EVEN$$

where EVEN is the data signals produced by the even numbered elements of the scanning array, $\overline{Y}$ is the data signal preceding the data signal which is being taken as a present data signal, and $\overline{ODD}$ is the data signals produced by the odd numbered elements of the scanning array.

This logical operation may be considered as a type of conditional "OR" operation.

Whereas in the previous embodiments the scanning array is moved intermitently on an incremental basis in the main scan direction (perpendicular to the axis of the array) for scanning, it is also within the scope of the present invention to move the array continuously for scanning. In this case, however, since the data signals are produced sequentially by self-scanning in the array 301, the arrangement in which the array 301 is moved perpendicular to its own axis would result in the production of output signals corresponding to slanted lines on the document. This is because the array 301 moves by a finite distance between the generation of successive output data signals, so that the last data signal will represent a spot on the document which is spaced from a spot represented by a first data signal in the direction of scan. The result is a distorted image. This problem is not encountered in incremental scan because the array is stopped while all data signals are produced.

It has been determined that this problem may be overcome by slanting the array 301 as illustrated in FIGS. 14 and 15 in such a manner that a first photosensor element 302 is spaced from a last photosensor element 303 in a main scan direction 304. The slanting angle $\theta$ may be obtained as follows.

The main scanning speed $V_s$ (in the direction 304) may be expressed as $$V_s = l_s/t_s$$

where $l_s$ is the distance in the direction 304 the array 301 moves in a time $t_s$ between the production of successive data signals.

The velocity $V_o$ at which the photosensor elements are self-scanned in a subscan direction 306 may be expressed as $$V_o = l_o/t_o$$

where $l_o$ is the distance between adjacent photosensor elements in the direction 306 and $t_o$ is the time between production of successive data signals corresponding to adjacent photosensor elements. In this case, $$\tan \theta = l_s/l_o = V_s t_s / V_o t_o.$$

In order to exactly compensate for the slanting of the image lines, it is necessary that $t_s = t_o$. Thus, $\tan \theta = V_s/V_o$ (where $V_o \geq V_s$). The angle $\theta$ is obtained as $\theta = \tan^{-1} V_s/V_o$. In actual application where the scanning height is 8 mm or 4 mm, the angle $\theta$ will typically be on the order of 0.64°.

Figure 16B:
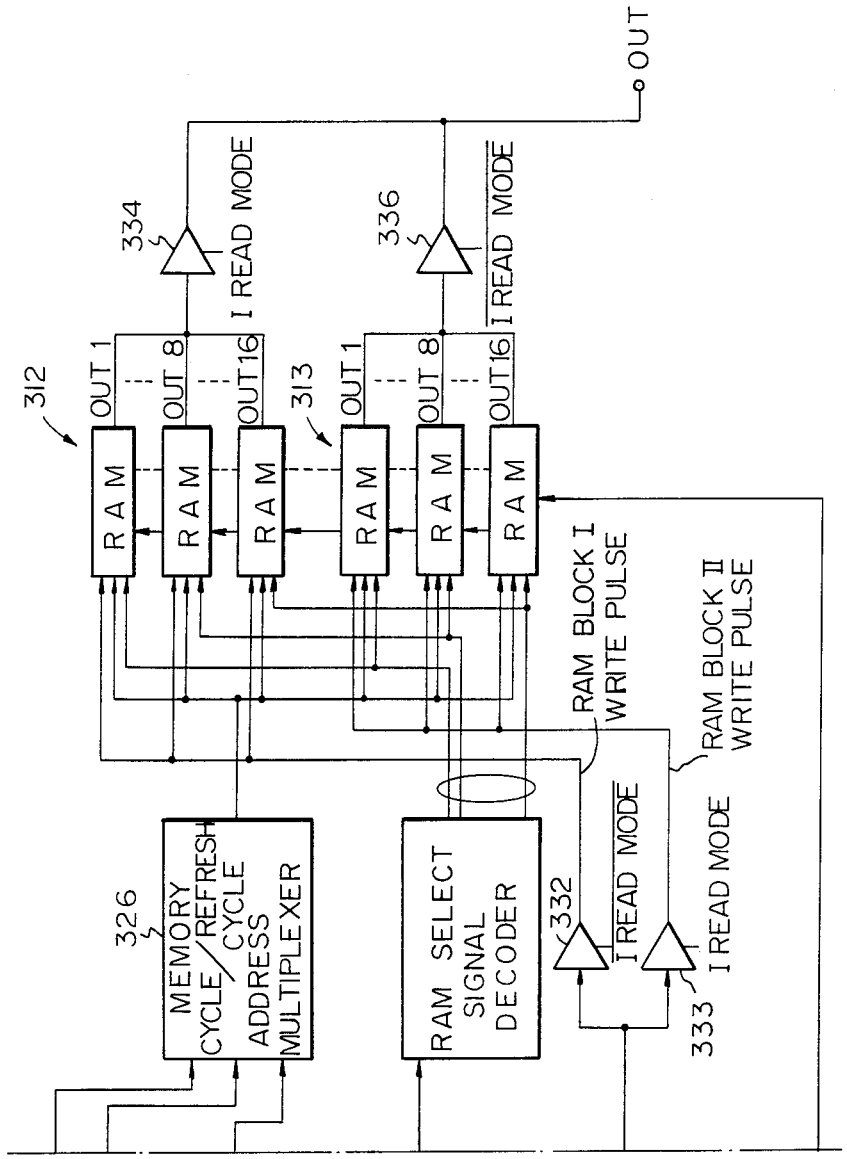

FIG. 16 illustrates another facsimile tranceiver 311 which comprises first and second dynamic RAM blocks 312 and 313. Each RAM block 312 and 313 comprises sixteen dynamic RAMs each having a capacity of 4K memory locations. Each RAM is used to store two scan lines of data signals, or 1728×2=3456 data signals. The sixteen RAMs of each block are therefore capable of storing the data signals for an entire scanning area of 32×1728 points, or 55,296 data signals.

The data signals from the array 301 are fed to an input logic selector 316 which has an output connected to the RAM blocks 312 and 313. The purpose of the selector 316 is to pass the data signals therethrough in unaltered form in the detail mode and to perform the conditional "OR" operation described hereinabove in the standard mode. The RAM blocks 312 and 313 are constructed to be operated simultaneously in alternating read and write modes. When one RAM block 312 or 313 is operating in the write mode, the other will be operating in the read mode and vice-versa.

Figure 17B:
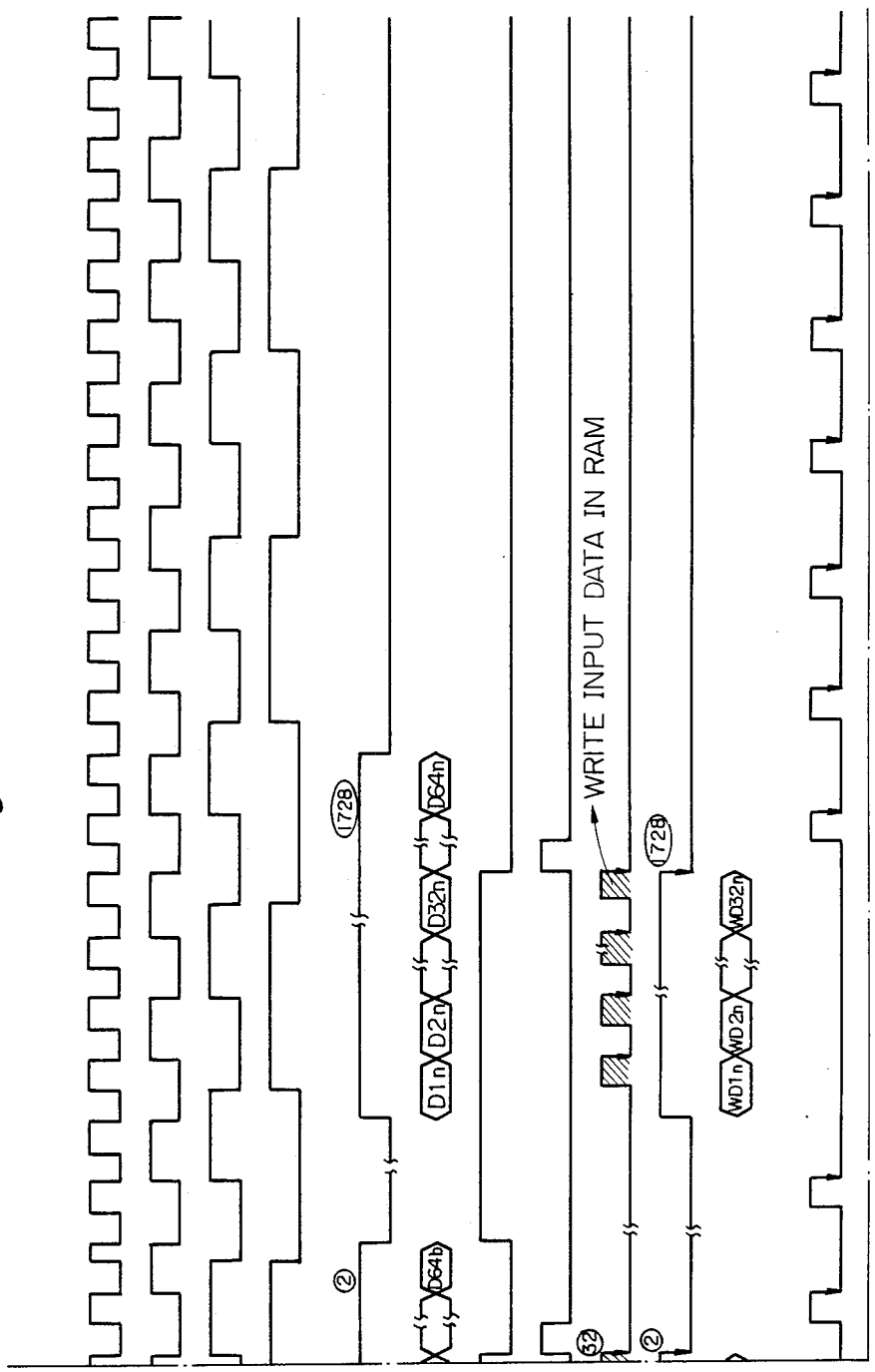
Figure 17C:
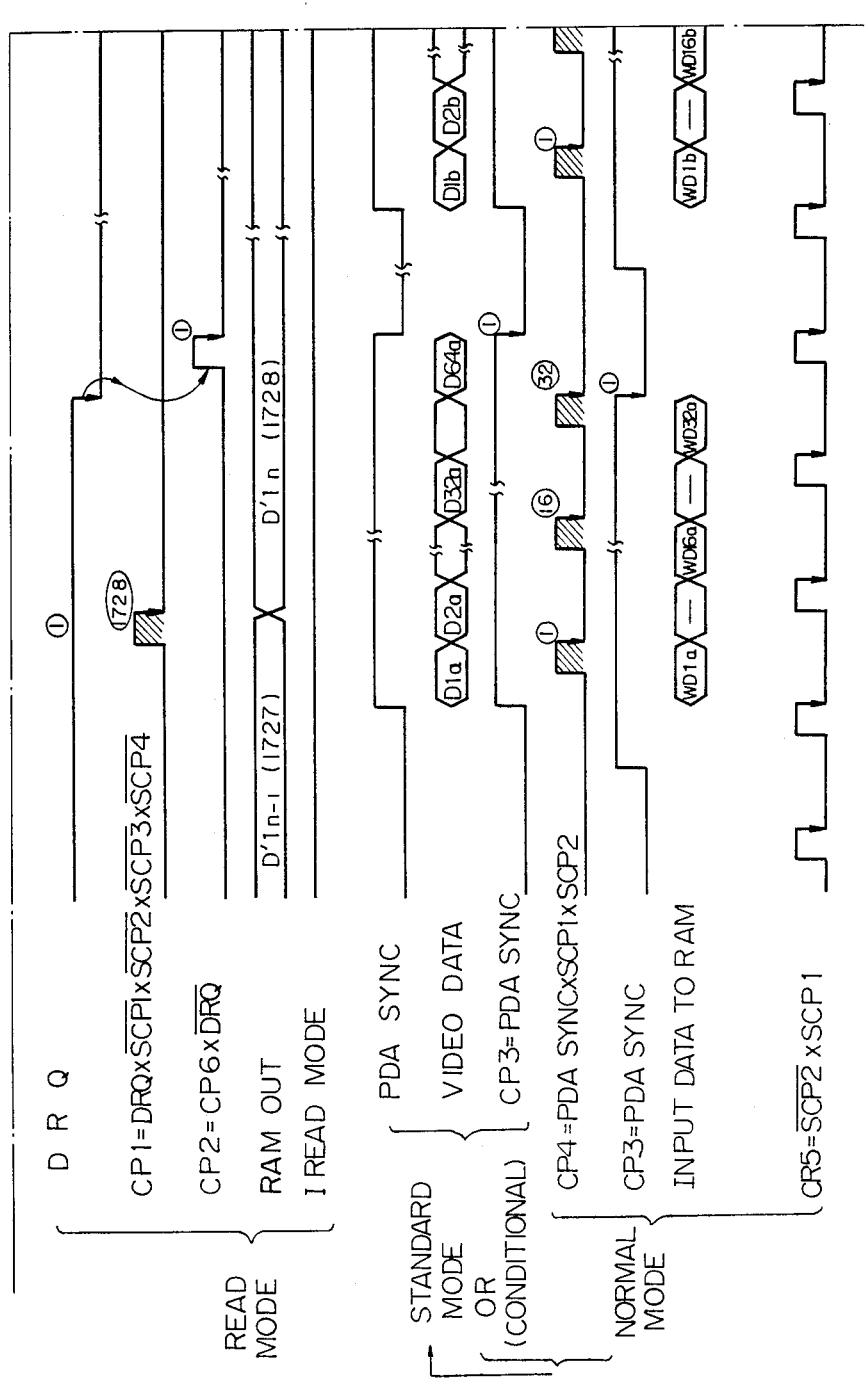
Figure 17D:
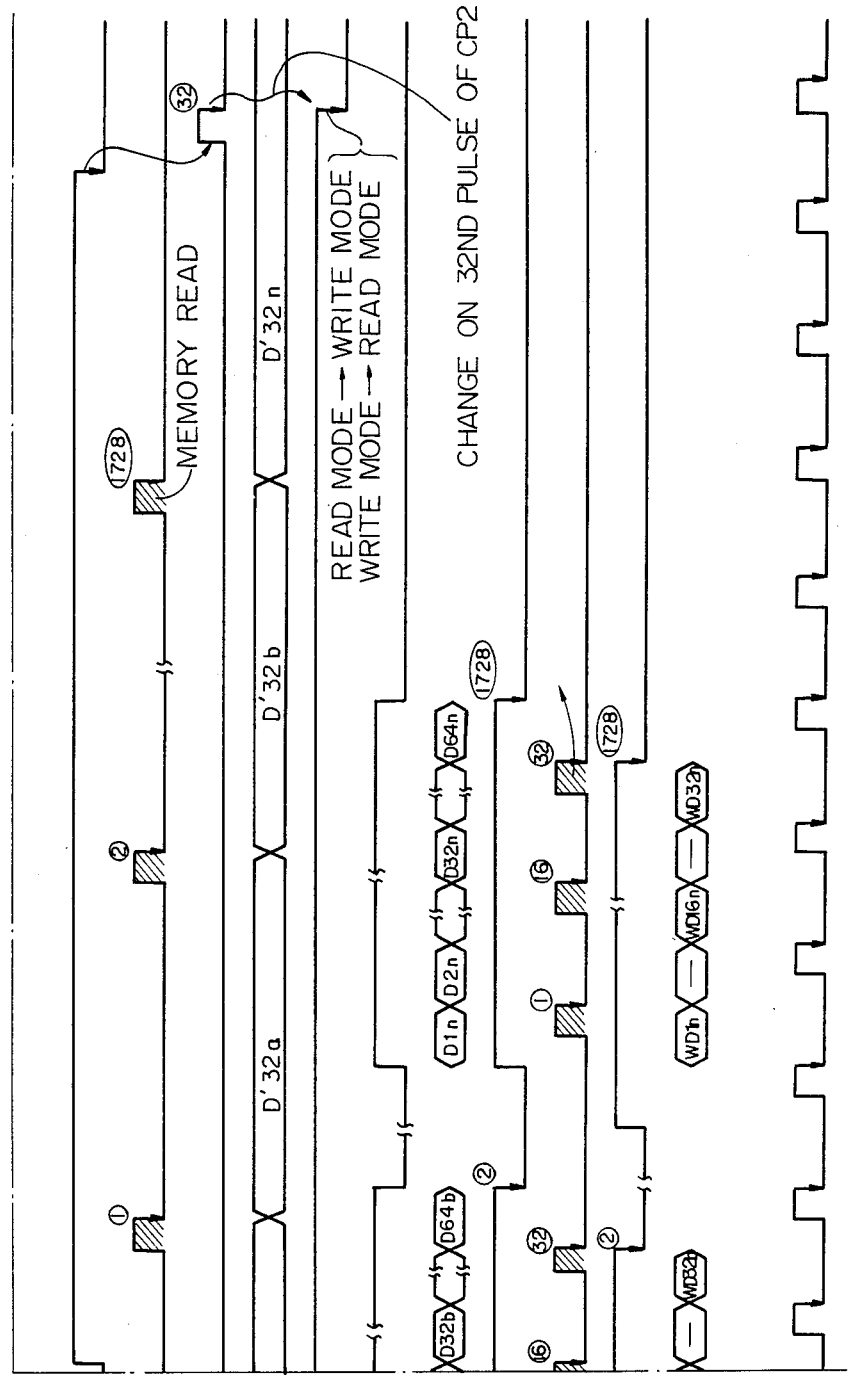

A control means (not shown) generates system clock pulses SCP1 to SCP4 which are combined logically to produce clock pulses CP1 to CP4 as shown in FIG. 17. A read clock generator 317 produces the clock pulses CP1 and CP2 and feeds the same to an X-address counter A 318 and a Y-address counter A 319 respectively. The output of the counter 319 as well as the clock pulses CP1 are fed to an X-address multiplexer 321. The clock pulses CP1 function as select signals for the multiplexer 321. When the clock pulses are logically high, the multiplexer 321 will select the output of the counter 318.

The clock pulses CP3 and CP4 are produced by a write clock generator 320 and fed to an X-address counter B 322 and a Y-address counter B 323. The output of the counter 322 is fed to another input of the multiplexer 321 and is selected when the clock pulses CP1 are logically low. The outputs of the counters 319 and 323 are fed to inputs of a Y-address multiplexer 324 along with the clock pulses CP4 which function as select signals for the multiplexer 324. The output of the counter 332 is selected when the clock pulses CP4 are logically high and the couter 319 is selected when the clock pulses P4 are logically low.

The output of the multiplexer 321 is fed through a multiplexer 326 to column select inputs of the RAM blocks 312 and 313. The output of the multiplexer 324 is connected through a RAM select signal decloder 327 to the RAM (or row) select inputs of the RAM blocks 312 and 313. The output of the multiplexer 326 selects the memory location in the row direction in the RAM blocks whereas the output of the decoder 327 selects the memory location in the column direction (the individual RAM) in the RAM blocks. Thus, each combination of outputs of the units 326 and 327 specifies a particular memory location in the RAM blocks 312 and 313.

A density select signal is produced by the control unit which specifies standard or detail mode and is fed to the selector 316 as well as a refresh clock generator 328 which produces the clock pulses CP5 for refreshing the dynamic RAMs. The clock pulses CP5 are fed to a refresh address counter 329 and also to the multiplexer 326 as a select signal. The output of the counter 329 is selected when the clock pulses CP5 are logically high and vice-versa.

A RAM block read/write control 331 produces I read mode and $\overline{\text{I read mode}}$ signals which are opposite in logical sense and are fed as enable signals to buffers 332, 333, 334 and 336 which control the RAM blocks 312 and 313 to alternatingly operate in the read and write modes. When one of these signals is high, it will cause the associated RAM block to function in the read mode and vice-versa. The buffers 332 and 333 are for input control and the buffers 334 and 336 are for output control of the RAM blocks 312 and 313. Further illustrated are a CP6 signal generator 337 and a CP8 signal generator 338 which will be described below.

The B-counters 322 and 323 generate a write pattern for writing data signals into the RAM blocks 312 and 313 by columns. The counter 323 counts from 1 to 32 in response to the clock pulses CP4. One clock pulse CP3 is produced for each 32 clock pulses CP4 so that the X-address counter 322 is incremented once each time a column of data signals is written into the RAM blocks.

The A-counters 318 and 319 function to address the RAM blocks so as to read out the data signals by rows. The counter 318 counts from 1 to 1728 to read out a row of data signals in response to the clock pulses CP1. A clock pulse CP2 is generated for each 1728 clock pulses CP1 to read out the 32 rows of data signals. The multiplexers 321 and 324 are switched by the clock pulses CP1 and CP4 to alternatingly apply the read and write addresses to the RAM blocks 312 and 313 in a time-sharing manner. A PDA sync signal is generated at the beginning of production of the data signals by the array 301 and fed to the generators 320 and 338 to synchronize the production of the clock pulses CP3 and CP4 with the output data of the array 301. A scan end sync signal is generated when the array 301 reaches a scan end position in which all data signals have been produced. The scan end signal causes the control 331 to change over and reverse the read-write functions of the RAM blocks 312 and 313.

A data request signal DRQ is generated by a run length encoder or compressor (not shown) and applied to the generator 317 to synchronize the generation of the clock pulses CP1 and CP2 with the operation of the compressor. The signal DRQ is high as long as a buffer memory in the compressor is not full and the compressor is able to receive more data signals. Although not shown, the DRQ signal may also be used to inhibit scanning movement of the array 301 when the signal DRQ is low.

The signal DRQ is produced each time a line (1728 signals) of data signals has been processed by the compressor and is applied to the generators 317 and 337. The generator 337 produces the clock pulses CP6 which are used to control the generator 317. The Y-address counter 323 produces the signal CP9 at the end of each complete write operation. The generator 338 produces the signal CP8 in response to the signal CP9 which is used to synchronize the generator 320. The switching of the RAM blocks is performed by the scan end sync signal the first time and by the output of the counter 319 thereafter.

Figure 18:
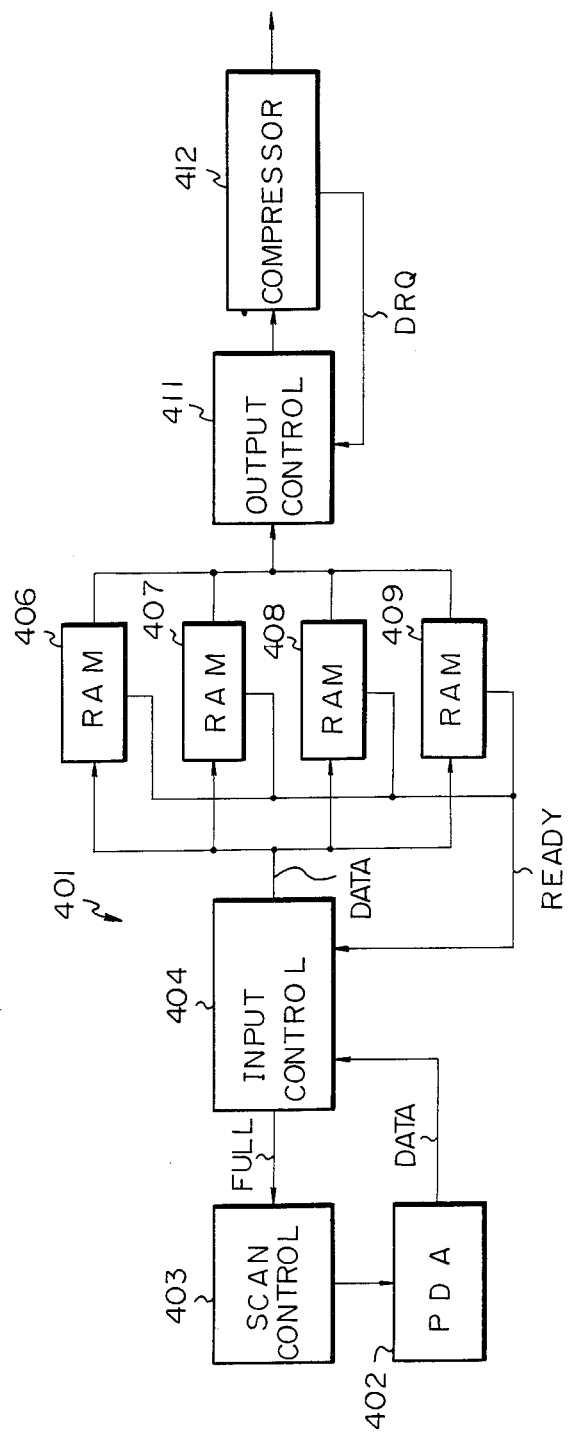
FIG. 18 is a schematic block diagram of another embodiment of a facsimile apparatus of the present invention.

FIG. 18 illustrates another embodiment of the present invention in the form of a facsimile transceiver 401. The output of a PDA scanning array 402 is fed to an input control unit 404. The array 402 is moved for scanning by a scan control unit 403.

The data signals are fed from the input control unit 404 to RAMs 406 to 409 in a sequential manner. Each RAM 406 to 409 is capable of storing a plurality of lines of data and feed the same through an output control unit 411 to a compressor 412.

The lines of data are read out of the RAMs 406 to 409 sequentially by the output control unit 411 in response to a data request signal DRQ from the compressor 412 regardless of the status of the array 402 and unit 403. Each RAM 406 to 409 produces a read signal when it has been operated in the read mode, indicating that it is available to store more data signals. The input control unit 404 senses the ready signals and produces a full signal which is applied to the scan control unit 403 when none of the RAMs 406 to 409 produces a ready signal, indicating that all of the RAMs are full. The full signal causes the scan control unit 403 to hold the array 401 stationary in an initial position in preparation for scanning. Thus, the array 401 will not be moved for scanning until one of the RAMs 406 to 409 becomes available to store data and produces a ready signal.

Various modifications will be possible for those of skill in the art after receiving the teachings of the present disclosure without departing from the scope thereof.

What is claimed is:

1. A facsimile transceiver apparatus including a scanning array of photosensor elements extending in a first direction, scan drive means for moving the scanning array in a second direction which is different from the first direction for scanning an original document, the photosensor elements producing data signals corresponding to incident light from the document, transmission means for transmitting the data signals; receiving means for receiving data signals, a printing array of printing elements extending in a third direction and print drive means for moving the printing array in a fourth direction which has a same relationship to the third direction as the second direction has to the first direction for printing a pattern on a printing surface corresponding to the received data signals, characterized by comprising;

orthogonal conversion memory means for performing orthogonal conversion on data signals fed from the scanning array to the transmission means and for performing reverse orthogonal conversion on data signals fed from the receiving means to the printing array; and data compression means connected between the memory means and the transmission means for compressing data signals and expansion means connected between the receiving means and the memory means for expanding data signals;

the memory means comprising a plurality of orthogonal memories which are constructed to sequentially store a plurality of lines of data signals, the scan drive means comprising means for detecting when at least one of the orthogonal memories is available to store data signals and move the scanning array for scanning in response thereto, the scan drive means holding the scanning array in an initial position thereof in response to none of the orthogonal memories being available to store data signals, the compression means reading data signals out of the orthogonal memories sequentially in accordance with a variable compression rate thereof regardless of whether or not the scanning array is moving.

2. An apparatus as in claim 1, in which the memory means comprises means for selectively connecting the orthogonal memories between the scanning array and the transmission means or between the receiving means and the printing array.

3. An apparatus as in claim 1, in which each orthogonal memory is constructed to store data signals in the form of a rectangular matrix having a row direction and a column direction, a number of memory locations in the column direction in the memory being equal to a number of the photosensor elements in the scanning array.

4. An apparatus as in claim 3, in which the number of memory locations in the column direction in the memory is also equal to a number of printing elements in the printing array.

5. An apparatus as in claim 3, further comprising means for selectively connecting the memory means between the scanning array and the transmission means and controlling the memory means in such a manner as to store the data signals from the scanning array by columns and read out and feed the data signals to the transmission means by rows; or connecting the memory means between the receiving means and the printing array and controlling the memory means in such a manner as to store the data signals from the receiving means by rows and read out and feed the data signals to the printing array by columns.

6. An apparatus as in claim 1, in which the scanning array comprises means for enabling the photosensor elements to produce respective data signals, the scan drive means being constructed to move the scanning array by an incremental distance in the second direction each time all of the photosensor elements produce data signals.

7. An apparatus as in claim 1, in which the memory means is a serial-out memory, the apparatus further comprising a serial-to-parallel converter connected between the memory means and the printing array.

8. An apparatus as in claim 1, in which the scanning array comprises a charge-coupled-device photosensor array.

9. An apparatus as in claim 1, in which the scan drive means is constructed to reciprocatingly move the scanning array relative to the original document in the second direction and is further constructed to move the original document perpendicular to the second direction by a distance equal to a length of the scanning array after each reciprocation of the scanning array; the print drive means being constructed to reciprocatingly move the printing array in the fourth direction and being further constructed to move the printing surface perpendicular to the fourth direction by a distance equal to a length of the printing array after each reciprocation of the printing array.

10. An apparatus as in claim 1, in which the first direction is substantially perpendicular to the second direction and the third direction is substantially perpendicular to the fourth direction.

11. An apparatus as in claim 1, in which the compression means is constructed to run length encode data signals and the expansion means is constructed to run length decode data signals.

12. An apparatus as in claim 10, in which the scan drive means is constructed to move the scanning array continuously in the second direction for scanning, the photosensor elements producing the data signals sequentially from a first photosensor element to a last photosensor element, the scanning array being slanted such that the first photosensor element is spaced from the last photosensor in the second direction, an angle of the slanting being equal to $\tan^{-1} 1_s/1_o$, where $1_s$ is a distance the scanning array moves in the second direction in a length of time between production of two sequential data signals and $1_o$ is a distance between adjacent photosensor elements in the first direction.

13. An apparatus as in claim 1, in which the scanning array and scan drive means are constructed to be selectively operative in two different line scan densities.

14. An apparatus as in claim 13, further comprising means connected between the scanning array and the memory means for combining at least two adjacent data signals from the scanning array in a predetermined logical operation.

15. An apparatus as in claim 1, in which the memory means comprises two orthogonal memories which are operated alternatingly in read and write modes.

16. A facsimile transceiver apparatus including a scanning array of photosensor elements extending in a first direction, scan drive means for moving the scanning array in a second direction which is different from the first direction for scanning an original document, the photosensor elements producing data signals corresponding to incident light from the document, transmission means for transmitting the data signals; receiving means for receiving data signals, a printing array of printing elements extending in a third direction and print drive means for moving the printing array in a fourth direction which has a same relationship to the third direction as the second direction has to the first direction for printing a pattern on a printing surface corresponding to the received data signals, characterized by comprising:

orthogonal conversion memory means for performing orthogonal conversion on the data signals fed from the scanning array to the transmission means and for performing reverse orthogonal conversion on data signals fed from the receiving means to the printing array;

data compression means connected between the memory means and the transmission means for compressing data signals and expansion means connected between the receiving means and the memory means for expanding data signals;

the memory means comprising a plurality of orthogonal memories which are constructed to sequentially store a plurality of lines of data signals, the scan drive means comprising means for detecting when at least one of the orthogonal memories is available to store data signals and move the scanning array for scanning in response thereto, the scan drive means holding the scanning array in an initial position thereof in response to none of the orthogonal memories being available to store data signals, the compression means reading data signals out of the orthogonal memories sequentially in accordance with a variable compression rate thereof regardless of whether or not the scanning array is moving;

the scanning array and scan drive means being constructed to be selectively operative in two different line scan densities; and means connected between the scanning array and the memory means for combining at least two adjacent data signals from the scanning array in a predetermined logical operation, said operation being $$ODD + \overline{Y} \times \overline{ODD} \times EVEN$$

where EVEN is data signals produced by even numbered elements of the scanning array, Y is a data signal preceding a data signal which is being taken as a present data signal, and ODD is data signals produced by odd numbered elements of the scanning array.

* * * * *